United States Patent
Cheng et al.

(10) Patent No.: US 10,615,637 B2
(45) Date of Patent: Apr. 7, 2020

(54) UNINTERRUPTABLE POWER SUPPLY APPARATUS WITH SHARED ELECTRONIC COMPONENTS

(71) Applicant: DELTA ELECTRONICS, INC., Taoyuan (TW)

(72) Inventors: Chung-Chieh Cheng, Taoyuan (TW); Yung-Sheng Yan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/141,134

(22) Filed: Sep. 25, 2018

(65) Prior Publication Data
US 2019/0199126 A1    Jun. 27, 2019

(30) Foreign Application Priority Data

Dec. 25, 2017 (TW) .............................. 106145459 A

(51) Int. Cl.
| | |
|---|---|
| *H02M 3/156* | (2006.01) |
| *H02J 9/06* | (2006.01) |
| *H02M 5/458* | (2006.01) |
| *H02M 1/10* | (2006.01) |

(Continued)

(52) U.S. Cl.
CPC ............. *H02J 9/062* (2013.01); *G06F 1/30* (2013.01); *H02M 1/10* (2013.01); *H02M 3/156* (2013.01); *H02M 5/4585* (2013.01); *H02M 7/5387* (2013.01); *H02J 2009/063* (2013.01)

(58) Field of Classification Search
None
See application file for complete search history.

(56) References Cited

U.S. PATENT DOCUMENTS

| 6,104,104 A | 8/2000 | Kuroki | |
|---|---|---|---|
| 2005/0201127 A1* | 9/2005 | Tracy | .................. H02J 9/062 363/37 |

(Continued)

FOREIGN PATENT DOCUMENTS

| CN | 102832688 B | 12/2012 |
|---|---|---|
| EP | 1076403 A2 | 2/2001 |

(Continued)

OTHER PUBLICATIONS

US 6181581B1, Jan. 30, 2001, Samsung Electronics Co Ltd. (withdrawn).

*Primary Examiner* — Jeffrey A Gblende
(74) *Attorney, Agent, or Firm* — Muncy, Geissler, Olds & Lowe, PC

(57) ABSTRACT

An uninterruptible power supply apparatus includes a switch, a first inductor, a direct current controlling unit, a first bridge arm, a second bridge arm and a third bridge arm. When the switch switches the first inductor coupled to an alternative current (AC) power, the AC power converts into a bus voltage via the first inductor, the first bridge arm and the second bridge arm, and converts into an output power via the second bridge arm and the third bridge arm. When the switch switches the first inductor coupled to a DC power, the DC power converts into the bus voltage via the DC controlling unit and the first inductor, and converts into the output power via the second bridge arm and the third bridge arm.

16 Claims, 22 Drawing Sheets

(51) Int. Cl.
*G06F 1/30* (2006.01)
*H02M 7/5387* (2007.01)

(56) References Cited

U.S. PATENT DOCUMENTS

| | | | | |
|---|---|---|---|---|
| 2008/0012426 A1* | 1/2008 | Lu | ............................ | H02J 9/062 |
| | | | | 307/65 |
| 2008/0061628 A1* | 3/2008 | Nielsen | .................... | H02J 9/062 |
| | | | | 307/66 |
| 2010/0054002 A1* | 3/2010 | Lu | ............................ | H02J 9/062 |
| | | | | 363/37 |
| 2012/0217809 A1* | 8/2012 | Sato | ........................ | H02J 9/062 |
| | | | | 307/64 |

FOREIGN PATENT DOCUMENTS

| | | |
|---|---|---|
| EP | 2759038 B1 | 11/2018 |
| JP | 2009303349 A | 12/2009 |
| TW | 200805855 A | 1/2008 |

\* cited by examiner

UNINTERRUPTABLE POWER SUPPLY APPARATUS WITH SHARED ELECTRONIC COMPONENTS

BACKGROUND

Technical Field

The present disclosure relates to an uninterruptible power supply apparatus. More particularly, the present disclosure relates to an uninterruptible power supply apparatus has the features of improving efficiency, reducing the component number, and increasing the stability.

Description of Related Art

As the electronic equipment becomes more intricate, there is an ever increasing need to provide reliable power to the electronic equipment since the electronic equipment is under unstable operation caused by unstable input power quality. Therefore, uninterruptible power supply devices are installed in the front end of the electronic devices to provide high-quality power when the input power is interrupted or abnormally powered. The uninterruptible power supply not only supplies power when the input power is interrupted, but also regulates the power with poor quality when the magnitude of input power is normal, and filters out noise and lightning protection to provide the electronic equipment with stability power.

The current uninterruptible power supply device is constituted of three independent circuits, i.e., an alternative current (AC) to direct current (DC) power converter, a DC to DC power converter, and an inverter. If input power of uninterruptible power supply varies or is interrupted, power to the load is maintained for a limited amount of time or to provide time to shut down the load without resulting damage. However, the uninterruptible power supply device is bulky since the large component number of the uninterruptible power supply device in which consist of the AC to DC power converter, the DC to DC power converter, and the inverter. Furthermore, the controlling unit of the uninterruptible power supply device needs to provide corresponding signals for controlling the AC to DC power converter, the DC to DC power converter, and the inverter, respectively. These cause not only increases control complexity and cost but lowers overall stability and efficiency.

Accordingly, it is desirable to provide an uninterruptible power supply apparatus to reduce component number to improve overall stability and efficiency and reduce cost.

SUMMARY

In order to solve the problem mentioned in the related art, an uninterruptible power supply apparatus according to one aspect of the present disclosure induces a switch, a first inductor, a direct current (DC) controlling unit, a first bridge arm, a second bridge arm, a bus capacitor, and a third bridge arm. The switch is coupled to an alternative current (AC) power, the first inductor is coupled to the switch, the DC controlling unit is coupled to a DC power and the switch, the first bridge arm is coupled to the first inductor, the second bridge arm is connected in parallel with the first bridge arm, the bus capacitor is connected in parallel with the second bridge arm, and the third bridge arm is connected in parallel with the third bridge arm. When the switch is selected to connect the first inductor to the AC power, The AC power is converted to a bus voltage across the bus capacitor through the first inductor, the first bridge arm, and the second bridge arm, and converted to an output power through the second bridge arm and the third bridge arm when the switch is switched to connect the first inductor to the AC power; the DC power is converted to the bus voltage through the DC controlling unit and the first inductor, and then converted to the output power through the second bridge arm and the third bridge arm when the switch is switched to connect the first inductor to the DC controlling unit.

In an embodiment of the present disclosure, the first bridge arm includes a first switch and a second switch, the first switch is connected in parallel to a first diode, and coupled to a first terminal of the bus capacitor and the first inductor, and the second switch is connected in parallel to a second diode, and coupled to the first inductor and a second terminal of the bus capacitor; the second bridge arm includes a third switch and a fourth switch, the third switch is connected in parallel with a third diode and coupled to the first terminal of the bus capacitor and the AC power, and the fourth switch is connected in parallel with a fourth diode, and coupled to the AC power and the second terminal of the bus capacitor.

In an embodiment of the present disclosure, the first inductor is under an energy-storing operation through a positive half-cycle energy-storing loop sequentially formed by the AC power, the first inductor, the second switch, and the fourth diode; the first inductor is under an energy-releasing operation through a positive half-cycle energy-releasing loop sequentially formed by the AC power, the first inductor, the first diode, the bus capacitor, and the fourth diode.

In an embodiment of the present disclosure, the first inductor is under an energy-storing operation through a negative half-cycle energy-storing loop sequentially formed by the AC power, the third diode, the first switch, and the first inductor; the first inductor is under an energy-releasing operation through a negative half-cycle energy-storing loop sequentially formed by the AC power, the third diode, the bus capacitor, the second diode, and the first inductor.

In an embodiment of the present disclosure, the DC controlling unit includes a second inductor, a power diode, and a power switch; the second inductor is coupled to the DC power and the switch, the power diode is coupled to the second inductor, and the power switch is coupled to the power diode and the DC power.

In an embodiment of the present disclosure, a voltage across the second inductor is coupled to the first indictor, and a voltage across of the first inductor is obtained by multiplying the voltage across the second inductor by a turn ratio of the first inductor to the second inductor.

In an embodiment of the present disclosure, the third bridge arm includes a fifth switch, a sixth switch, and an outputting circuit; the fifth switch is connected in parallel to a fifth diode and coupled to the first terminal of the bus capacitor, the sixth switch is connected in parallel to a sixth diode and coupled to the second terminal of the bus capacitor, and the outputting circuit is coupled to the fifth switch, the sixth switch, and the AC power for providing to the output power.

In an embodiment of the present disclosure, the uninterruptible power supply apparatus further includes a controlling unit configured to provide a plurality of controlling signals for controlling switch, the DC controlling unit, the first bridge arm, the second bridge arm, and the third bridge arm, such that the AC power or the DC power is converted to the bus voltage through the first inductor, the DC controlling unit, the first bridge arm, and the second bridge arm, and then converted to the output power through the second bridge and the third bridge arm.

According to another aspect of the present disclosure, an uninterruptible power supply apparatus includes a direct current (DC) controlling unit, a first inductor, a first bridge arm, a second bridge arm, a bus capacitor, and a third bridge arm. The direct current (DC) controlling unit is coupled to an alternative current (AC) power and a DC power, the first inductor is coupled to the DC controlling unit, the first bridge arm is coupled to the first inductor, the second bridge arm is connected in parallel with the first bridge arm, the bus capacitor is connected in parallel with the second bridge arm, and the third bridge arm is connected in parallel with the third bridge arm. The AC power is converted to a bus voltage across the bus capacitor through the first inductor, the first bridge arm and the second bridge arm and then converted to an output power through the second bridge arm and the third bridge arm when first inductor is controlled to couple to the AC power by the DC controlling unit; the DC power is converted to the bus voltage through the first inductor and the first bridge arm, and then converted to the output power through the second bridge arm and the third bridge arm when the first inductor is controlled to couple to the DC power by the DC controlling unit.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

A preferred embodiment of the present disclosure will be described with reference to the drawings.

Figure 1:
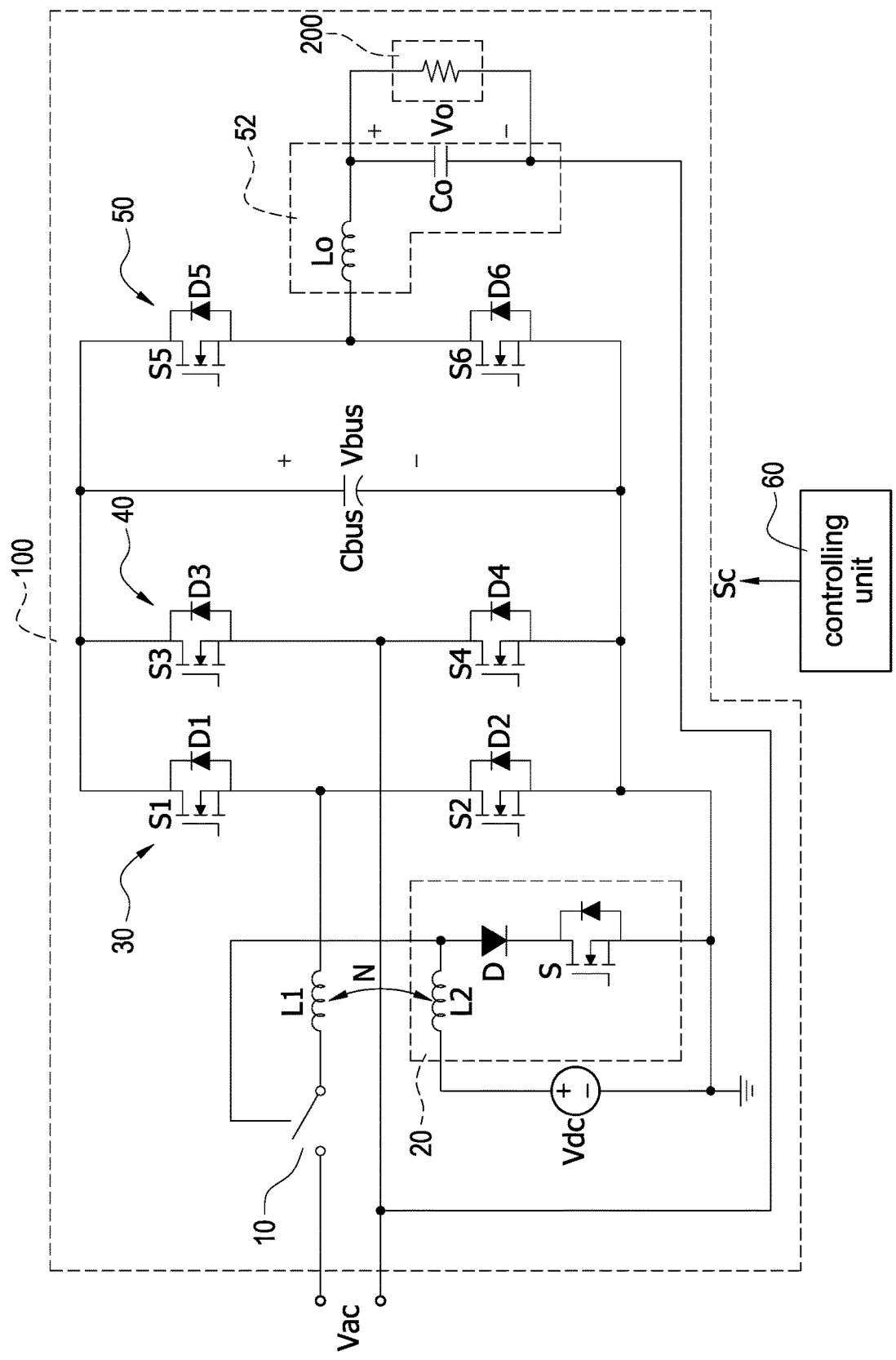
FIG. 1 is a circuit block diagram of an uninterruptible power supply apparatus according to a 1st embodiment of the present disclosure.

FIG. 1 is a circuit block diagram of an uninterruptible power supply apparatus according to a 1st embodiment of the present disclosure. In FIG. 1, the uninterruptible power supply apparatus 100 is coupled to an alternative current (AC) voltage Vac and a direct current (DC) voltage Vdc and configured to convert the AC voltage or the DC voltage Vdc to an output voltage Vo for providing to a load 200. The uninterruptible power supply apparatus 100 includes a switch 10, a first inductor L1, a DC controlling unit 20, a first bridge arm 30, a second bridge arm 40, a bus capacitor Cbus, a third bridge arm 50, an outputting circuit 52, and a controlling unit 60. The switch 10 is coupled to the AC voltage Vac, the first inductor L1, and the DC controlling unit 20, and the DC controlling unit 20 is coupled to the DC voltage Vdc. The first bridge arm 30, the second bridge arm 40, the bus capacitor Cbus, and the third bridge arm 50 are electrically connected in parallel and configured to provide the output voltage Vo to the load 200. The controlling unit 60 is configured to output a plurality of controlling signals Sc for controlling the switch 10, the DC controlling unit 20, the first bridge arm 30, the second bridge arm 40, and the bridge arm 50, respectively, such that the uninterruptible power supply apparatus 100 can convert the AC voltage Vac or the DC voltage Vdc to the output voltage Vo.

In an embodiment of the present disclosure, the switch 10 is a single pole double throw switch having three terminals. A first terminal of the switch 10 is coupled to the line wire of the AC voltage Vac, a second terminal of the switch 10 is coupled to a first terminal of the first inductor L1, and a third terminal of the switch 10 is coupled to the DC controlling unit 20. The controlling signal(s) provided by the controlling unit 60 is applied to the switch 10 for selectively connecting the first inductor L1 to the AC voltage Vac directly or the DC voltage Vdc through the DC controlling unit 20. The DC controlling unit 20 includes a second inductor L2, a power diode D, and a power switch S. In an embodiment of the present disclosure, a first terminal of the second inductor L2 is coupled to the positive terminal of the DC voltage Vdc, and a second terminal of the second inductor L2 is coupled to the third terminal of the switch 10 and the anode of the power diode D. A first terminal of the power switch S (such as drain) is coupled to the cathode of the power diode D and a second terminal of the power switch (such as source) is coupled to the negative terminal of the DC voltage Vdc and ground. The number of turns of the first inductor L1 has a relationship with the number of turns of the second inductor L2 depending on a turn ratio of the first inductor L1 to the second inductor L2 (details are described in the following paragraphs).

The first bridge arm 30 includes a first switch S1 and a second switch S2, and the second bridge arm 40 includes a third switch S3 and a fourth switch S4. A first terminal of the first switch S1 is couple to a first terminal of the third switch S3 and a first terminal of the bus capacitor Cbus, and a second terminal of the first switch S1 is coupled to a second terminal of the first inductor L1 and a first terminal of the second switch S2; a second terminal of the third switch S3 is coupled to the neutral wire of the AC voltage Vac and a first terminal of the fourth switch S4, and a second terminal of the second switch S2 is coupled to a second terminal of the fourth switch S4, a second terminal of the bus capacitor Cbus, and ground. The first bridge arm 30 further includes a first diode D1 and a second diode D2. The first diode D1 is electrically connected to the first switch S1 in parallel for providing a continuous-current flow path when the first switch S1 turns off, and the second diode D2 is electrically connected to the second switch S2 in parallel for providing a continuous-current flow path when the second switch S2 turns off. The second bridge arm 40 further includes a third diode D3 and a fourth diode D4. The third diode D3 is electrically connected to the third switch S3 in parallel for providing a continuous-current flow path when the third switch S3 turns off, and the fourth diode D4 is electrically connected to the fourth switch S4 in parallel for providing a continuous-current flow path when the fourth switch S4 turns off. It should be noted that the first to fourth diodes D1-D4 of the present disclosure may be body diodes respectively embedded in the first to fourth switches S1-S4 or additional diodes connected in parallel with the first to fourth switches S1-S4, respectively.

The first inductor L1 and the DC controlling unit 20 collectively constitute a DC to DC power conversion module; the controlling unit 60 is configured to control the DC to DC power conversion module for converting the DC voltage Vdc to the bus voltage Vbus. The first inductor L1, the first bridge arm 30, and the second bridge arm 40 collectively constitute an AC to DC power conversion module; the controlling unit 60 is configured to control the AC to DC power conversion module for converting the AC voltage Vac to the bus voltage Vbus. Specifically, when the AC voltage Vac is applied to the uninterruptible power supply apparatus 100, the controlling unit 60 switches the switch 10 for directly connecting the first inductor L1 to the AC voltage Vac, so that the AC to DC power conversion module consists of the first inductor L1, the first bridge arm 30, and the second bridge arm 40 may convert the AC voltage Vac to the bus voltage Vbus, and the bus voltage Vbus is stored in the bus capacitor Cbus. It should be noted that the AC to DC power conversion module may utilize the controlling unit 60 to provide the controlling signals Sc for controlling the first switch S1, the second switch S2, the third switch S3, and the fourth switch S4 to constitute a power factor convertor with power factor correction function.

The controlling unit 60 switches the switch 10 to make the first inductor L1 connected to the DC controlling unit 20 when the AC voltage Vac is powered down (i.e., the AC voltage Vac is not supplied to the uninterruptible power supply apparatus 100); at the time, the uninterruptible power supply apparatus 100 converts the DC voltage Vdc to the bus voltage Vbus by the DC to DC power conversion module consists of the first inductor L1 and the DC controlling unit 20, and the bus voltage Vbus is stored in the bus capacitor Cbus.

With referring to FIG. 1 again; the third bridge arm 50 includes a fifth switch S5 and a sixth switch S6. A first terminal of the fifth switch S5 is coupled to the first terminal of the bus capacitor Cbus, and a second terminal of the fifth switch S5 is coupled to a first terminal of the sixth switch S6 and the outputting circuit 52; a second terminal of the sixth switch S6 is coupled to the second terminal of the bus capacitor Cbus and ground. The third bridge arm 50 further includes a fifth diode D5 electrically connected to the fifth switch S5 in parallel for providing a continuous-current flow path when the fifth switch S5 turns off. The third bridge arm 50 still further includes a sixth diode D6 electrically connected to the sixth switch S6 in parallel for providing a continuous-current flow path when the sixth switch S6 turns off. It should be noted that the fifth diode D5 and sixth diode D6 of the present disclosure may be body diodes respectively embedded in the fifth switch S5 and sixth switch S6 or additional diodes connected in parallel with the fifth switch S5 and sixth switch S6, respectively.

In an embodiment of the present disclosure, the outputting circuit 52 may be a circuit, a wire or the combination thereof. For example, the outputting circuit 52 may be a filtering circuit consists of inductor(s) and capacitor(s), a rectifying circuit consists of diode(s) or switch(es) during it is the circuit; the outputting circuit 52 may be a power line for directly coupling the first terminal of the sixth switch S6 to the load 200. Owing to the voltage waveform of the node between the fifth switch S5, the sixth switch S6, and the outputting circuit 52 is a quasi-sinusoidal waveform (stepped sinusoidal waveform), the outputting circuit 52 could be a filtering circuit and configured to filter out the harmonic component of the node voltage. After that, the outputting circuit 52 output a smoothly sinusoidal voltage to the load 200. The node between the fifth switch S5 and the sixth switch S6 could be coupled to load 200 by a wire too when the load 200 can directly receive the quasi-sinusoidal voltage waveform (stepped sinusoidal waveform). The outputting circuit 52 according to an exemplary embodiment of the present disclosure is the filtering circuit includes an outputting capacitor Co and an outputting inductor Lo. More particularly, the node between the fifth switch S5 and the sixth switch S6 is coupled to a first terminal of the outputting inductor Lo; a first terminal of the outputting capacitor Co is coupled to a second terminal of the outputting terminal Lo, and a second terminal of the outputting capacitor Co is coupled to the neutral wire of the AC voltage Vac. The load 200 is electrically connected to the outputting capacitor Co in parallel. The second bridge 40 and the third bridge 50 collectively constitute an inverter module. The controlling unit 60 is configured to control the inverter module and make the bus voltage Vbus developed across the bus capacitor Cbus be converted to the output voltage Vo for providing to the load 200. It should be noted, however, that variants of the present disclosure may employ other outputting circuit 52 for providing the voltage developed across the node between the sixth switch S6 and the outputting circuit 52 to the load 200 without departing from the scope of the disclosure.

In this embodiment, the uninterruptible power supply apparatus 100 is constituted of the AC to DC power conversion module, the DC to DC power conversion module, and the inverter module; by the first inductor L1 and the first switch S1 collectively employed in the AC to DC power conversion module and the DC to DC power conversion module, and the third switch S3 and the fourth switch S4 collectively employed in the AC to DC power conversion module and the inverter module, the uninterruptible power supply apparatus 100 of the present disclosure features of reducing the component number, so that the utilization rate of the components is enhanced.

Figure 2A:
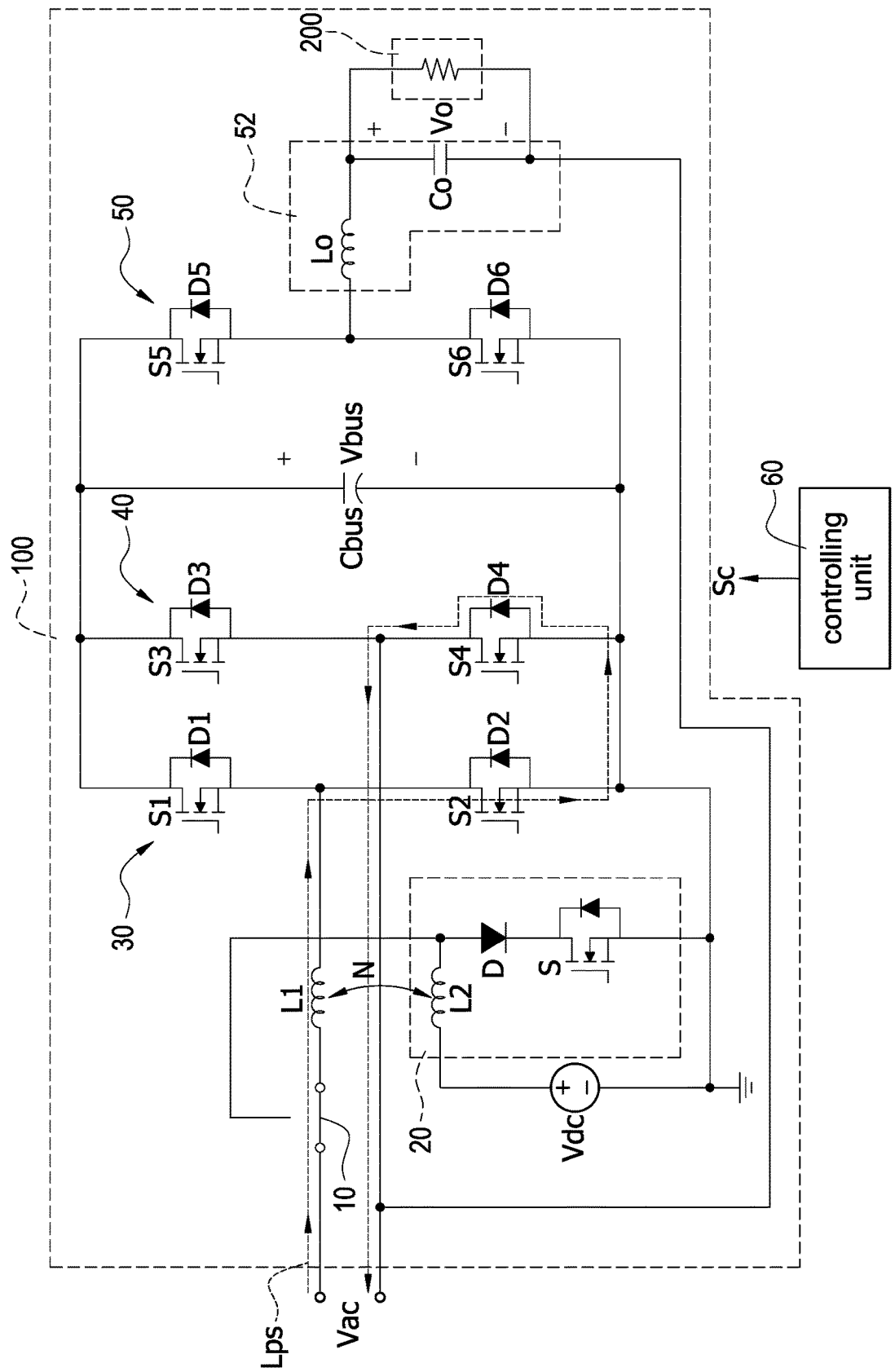
FIG. 2A is an equivalent diagram of the uninterruptible power supply apparatus under a positive half-cycle energy-storing loop according to the 1st embodiment of the present disclosure.

FIG. 2A is an equivalent diagram of the uninterruptible power supply apparatus under a positive half-cycle energy-storing loop according to the 1st embodiment of the present disclosure. In FIG. 1 and FIG. 2A, the controlling unit 60 outputs the controlling signal(s) Sc for controlling the switch 10 to selectively connected the AC voltage Vac to the first inductor L1 during the AC voltage Vac is supplied to the uninterruptible power supply apparatus 100. The controlling unit 60 further outputs the controlling signals Sc for controlling the first bridge arm 30 and the second bridge arm 40 to convert the AC voltage Vac to the bus voltage Vbus through the AC to DC power conversion module constituted of the first bridge arm 30 and the second bridge arm 40. As can be shown in FIG. 2A, the positive half-cycle energy-storing loop Lps is established while the AC voltage Vac is in a positive half-cycle and the first inductor L1 is charged by the AC voltage Vac. At the time, the positive half-cycle energy-storing loop Lps is sequentially formed by the line wire of the AC voltage Vac, the first inductor L1, the second switch S2, the fourth diode D4, and finally return to the neutral wire of the AC voltage Vac.

Figure 2B:
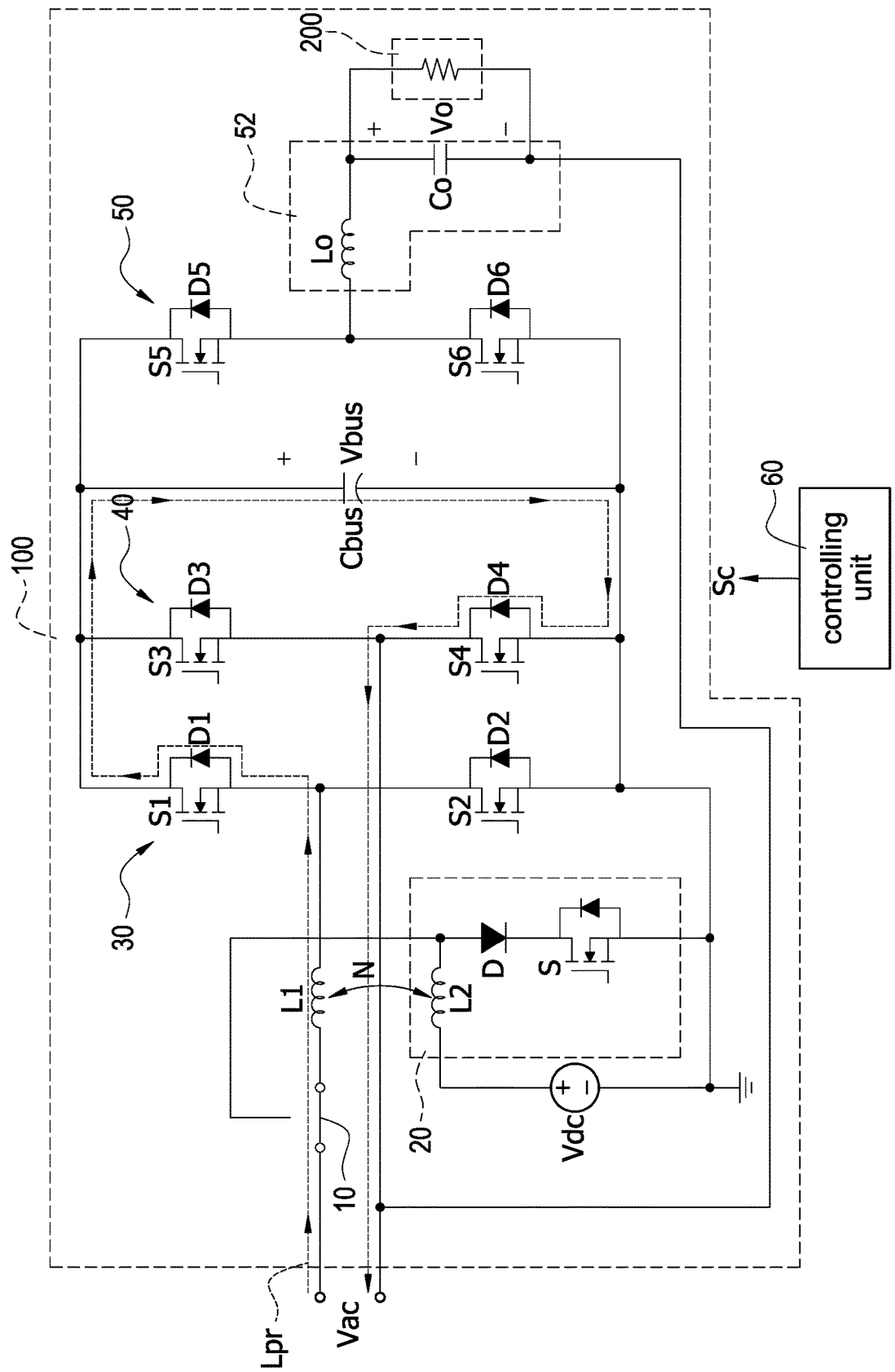
FIG. 2B is an equivalent diagram of the uninterruptible power supply apparatus under a positive half-cycle energy-releasing loop according to the 1st embodiment of the present disclosure.

FIG. 2B is an equivalent diagram of the uninterruptible power supply apparatus under a positive half-cycle energy-releasing loop according to the 1st embodiment of the present disclosure. In FIG. 1, FIG. 2A, and FIG. 2B, the positive half-cycle energy-releasing loop Lpr is established when the AC voltage Vac is in the positive half-cycle and the first inductor L1 discharges through the bus capacitor Cbus. At the time, the positive half-cycle energy-releasing loop Lpr is sequentially formed by the line wire of the AC voltage Vac, the first inductor L1, the first diode D1, the bus capacitor Cbus, the fourth diode (D4), and finally return to the neutral wire of the AC voltage Vac.

Figure 2C:
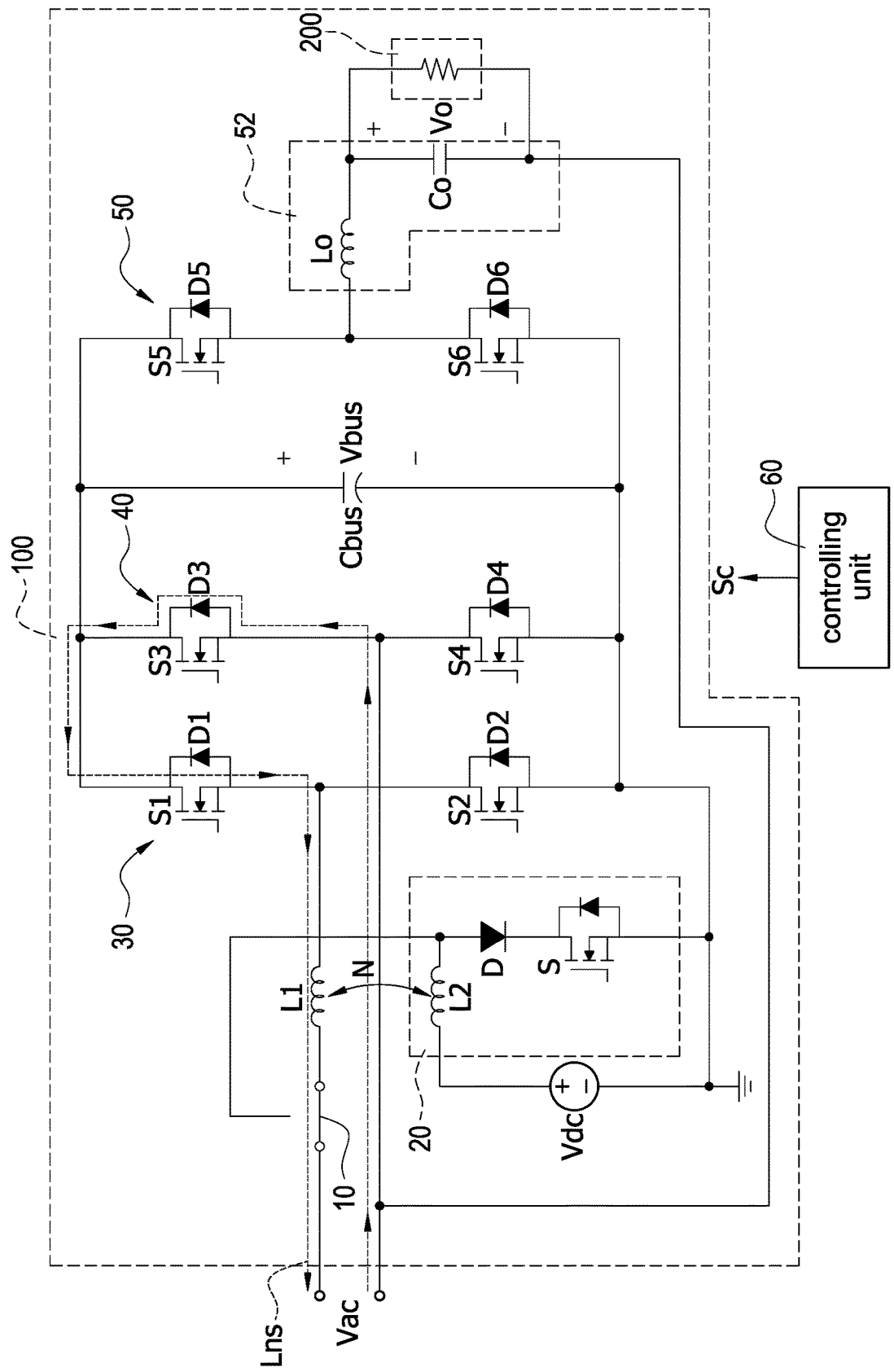
FIG. 2C is an equivalent diagram of the uninterruptible power supply apparatus under a negative half-cycle energy-storing loop according to the 1st embodiment of the present disclosure.

FIG. 2C is an equivalent diagram of the uninterruptible power supply apparatus under a negative half-cycle energy-storing loop according to the 1st embodiment of the present disclosure. In FIG. 1 and FIG. 2A to FIG. 2C, the negative half-cycle energy-storing loop Lns is established when the AC voltage Vac is in a negative half-cycle and the first inductor L1 is charged by the AC voltage Vac. At the time, the negative half-cycle energy-storing loop Lns is sequentially formed by the neutral wire of the AC voltage (Vac), the third diode D3, the first switch S1, the first inductor L1, and finally return to the line wire of the AC voltage Vac.

Figure 2D:
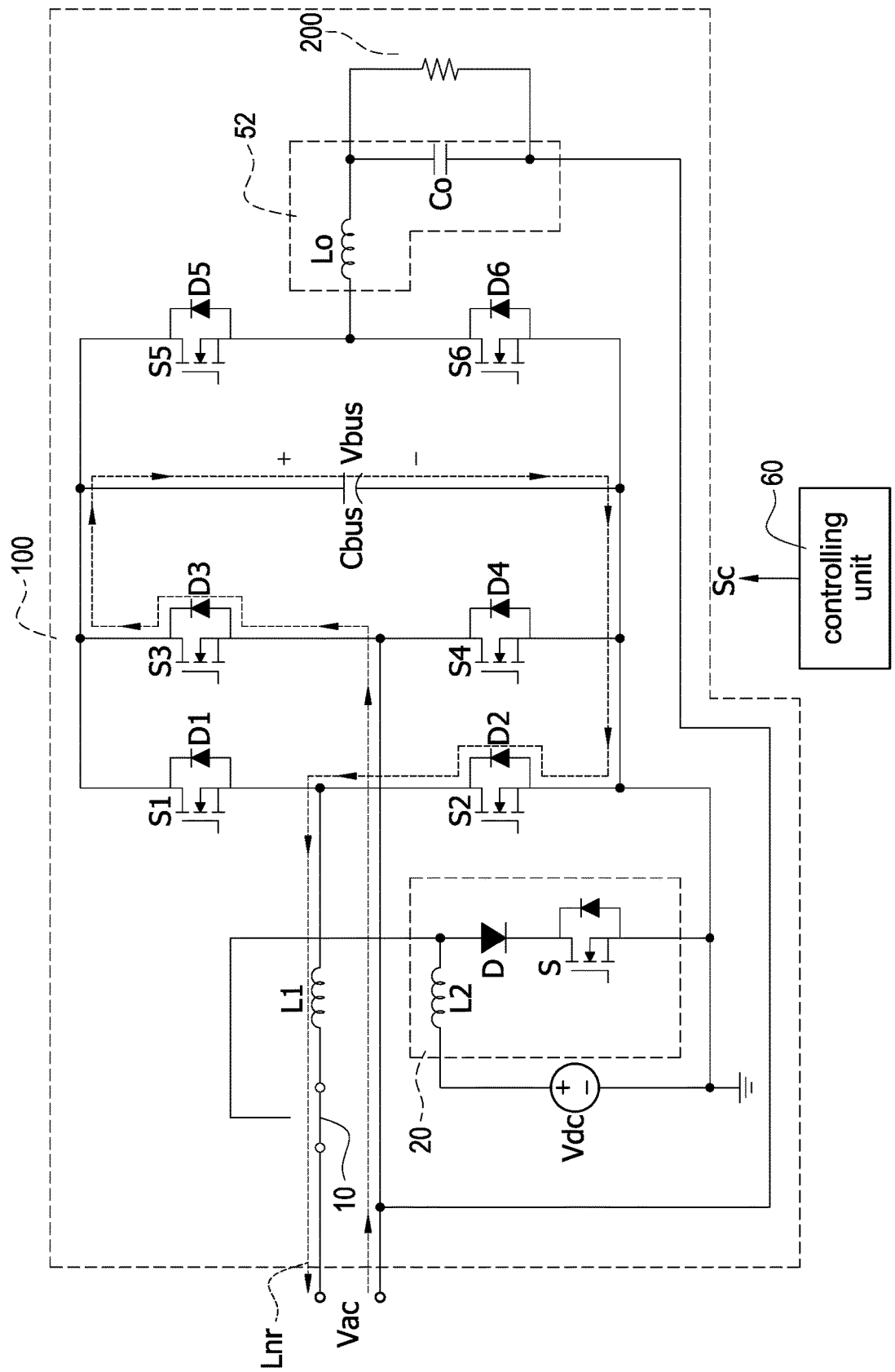
FIG. 2D is an equivalent diagram of the uninterruptible power supply apparatus under a negative half-cycle energy-releasing loop according to the 1st embodiment of the present disclosure.

FIG. 2D is an equivalent diagram of the uninterruptible power supply apparatus under a negative half-cycle energy-releasing loop according to the 1st embodiment of the present disclosure. In FIG. 1 and FIG. 2A to FIG. 2D, the negative half-cycle energy-releasing loop Lnr is established when the AC voltage Vac is in the negative half-cycle and the first inductor L1 discharges through the bus capacitor Cbus. At the time, the negative half-cycle energy-storing loop (Lnr) is sequentially formed by the neutral wire of the AC voltage Vac, the third diode D3, the bus capacitor Cbus, the second diode D2, and finally return to the line wire of the AC voltage Vac.

Figure 3A:
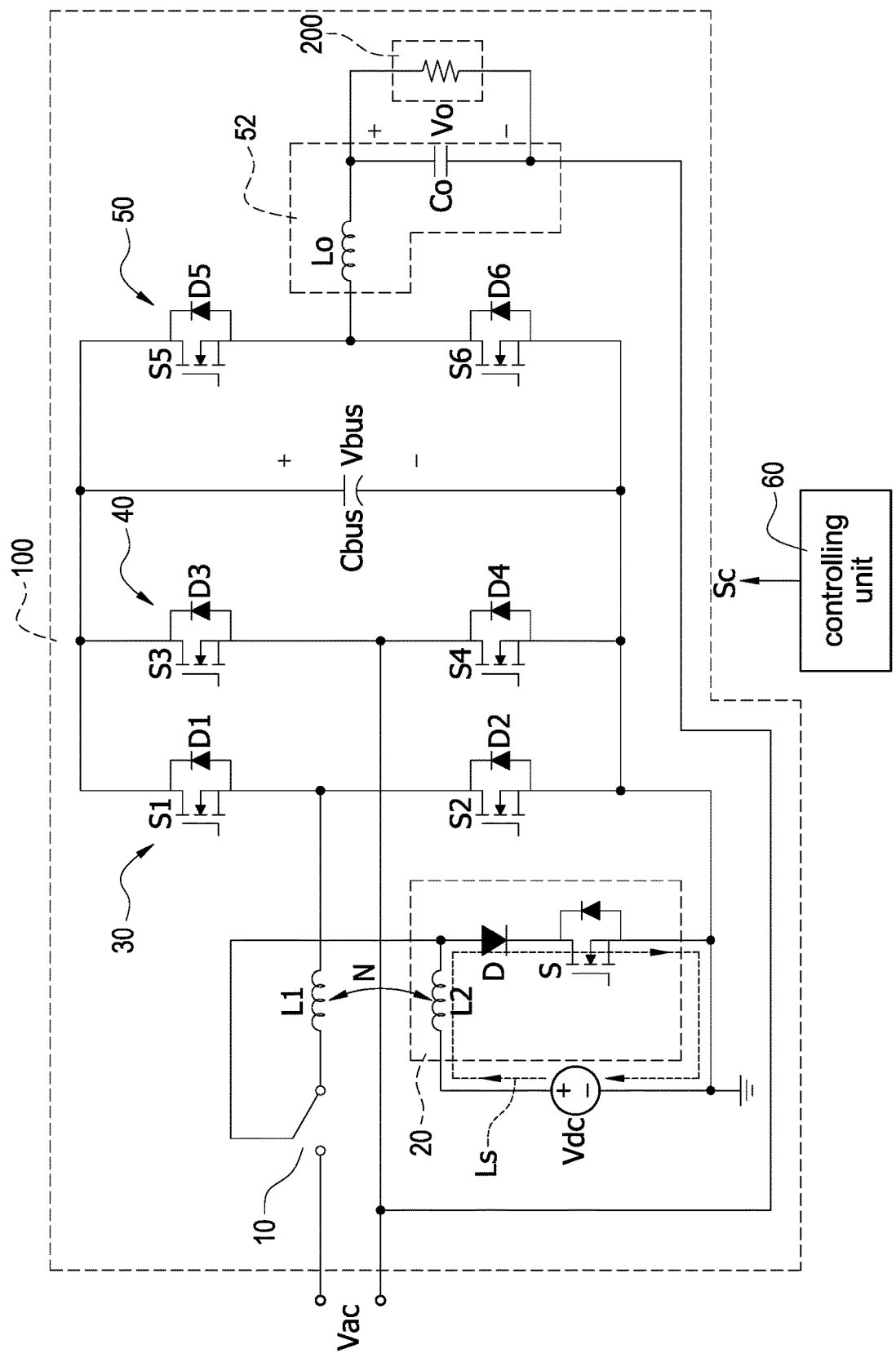
FIG. 3A is an equivalent diagram of the uninterruptible power supply apparatus under an energy-storing loop according to the 1st embodiment of the present disclosure.

FIG. 3A is an equivalent diagram of the uninterruptible power supply apparatus under an energy-storing loop according to the 1st embodiment of the present disclosure. In FIG. 1 and FIG. 3A, the controlling unit 60 outputs the controlling signal(s) Sc for controlling the switch 10 to selectively connected the DC voltage Vdc to the first inductor L1 through the DC controlling unit 20 during the AC voltage Vac is not supplied to the uninterruptible power supply apparatus 100. The controlling unit 60 further outputs the controlling signal(s) Sc for controlling the DC controlling unit 20 to convert the DC voltage Vdc to the bus voltage Vbus through the DC to DC power conversion module constituted of the DC controlling unit 20 and the first inductor L1. As can be shown in FIG. 3A, the energy-storing loop Ls is established while the AC voltage Vac is not supplied to the uninterruptible power supply apparatus 100, the power switch S is turned on by the controlling unit 60, and the second inductor L2 is charged by the DC voltage Vdc. The energy-storing loop Ls is sequentially formed by the positive terminal of the DC voltage Vdc, the second inductor L2, the power diode D, the power switch S, and finally return to the negative terminal of the DC voltage Vdc.

Figure 3B:
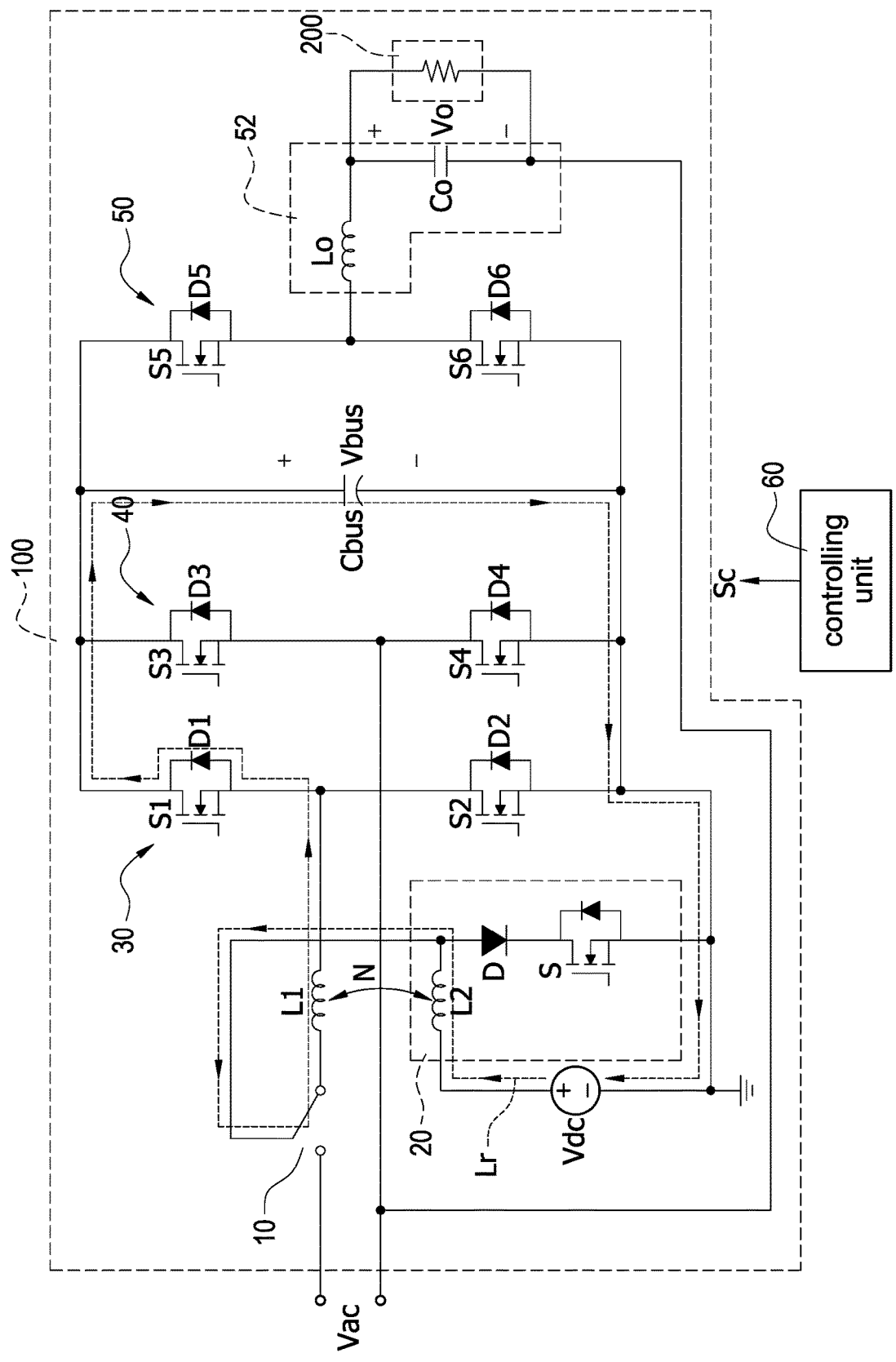
FIG. 3B is an equivalent diagram of the uninterruptible power supply apparatus under an energy-releasing loop according to the 1st embodiment of the present disclosure.

FIG. 3B is an equivalent diagram of the uninterruptible power supply apparatus under an energy-releasing loop according to the 1st embodiment of the present disclosure. In FIG. 1, FIG. 3A, and FIG. 3B, the energy-releasing loop Lr is established when the AC voltage Vac is not supplied to the uninterruptible power supply apparatus 100, the power switch S is turned off by the controlling unit 60, and the second inductor L2 discharges through the bus capacitor Cbus. The energy-releasing loop Lr is sequentially formed by the positive terminal of the DC voltage Vdc, the second inductor L2, the first inductor L1, the first diode D1, the bus capacitor Cbus, and finally return to the negative terminal of the DC voltage Vdc.

In the present embodiment, the first inductor L1 and the second inductor L2 collectively constitute a coupled inductor, and a turn number of the first inductor L1 and a turn number of the second inductor L2 have a relationship of a turn ratio N; in the other words, the turn number of the first inductor L1 is N times of the turn number of the second inductor L2. A voltage drop of the first inductor L1 has a relationship with the second inductor L2 depending on the turn ratio N. More particularly, the voltage across the second inductor L2 is coupled to the first indictor L1, and the voltage across the first inductor L1 is obtained by multiplying the voltage across the second inductor L2 by the turn ratio N. For example, the DC voltage Vdc is 40 volts, and the turn ratio N of the first inductor L1 to the second inductor L2 is 3. It results in the voltage across the second inductor L2 is 40 volts, the voltage across of the first inductor L1 is 120 volts (i.e., 40 volts*3), and the bus voltage Vbus is 200 volts (i.e., 40 volts+40 volts+120 volts). By the coupled inductor constituted of the first inductor L1 and the second inductor L2, the voltage stress of the first inductor L1 is reduced, which features that specification and size of the first inductor L1 is reduced.

Figure 4A:
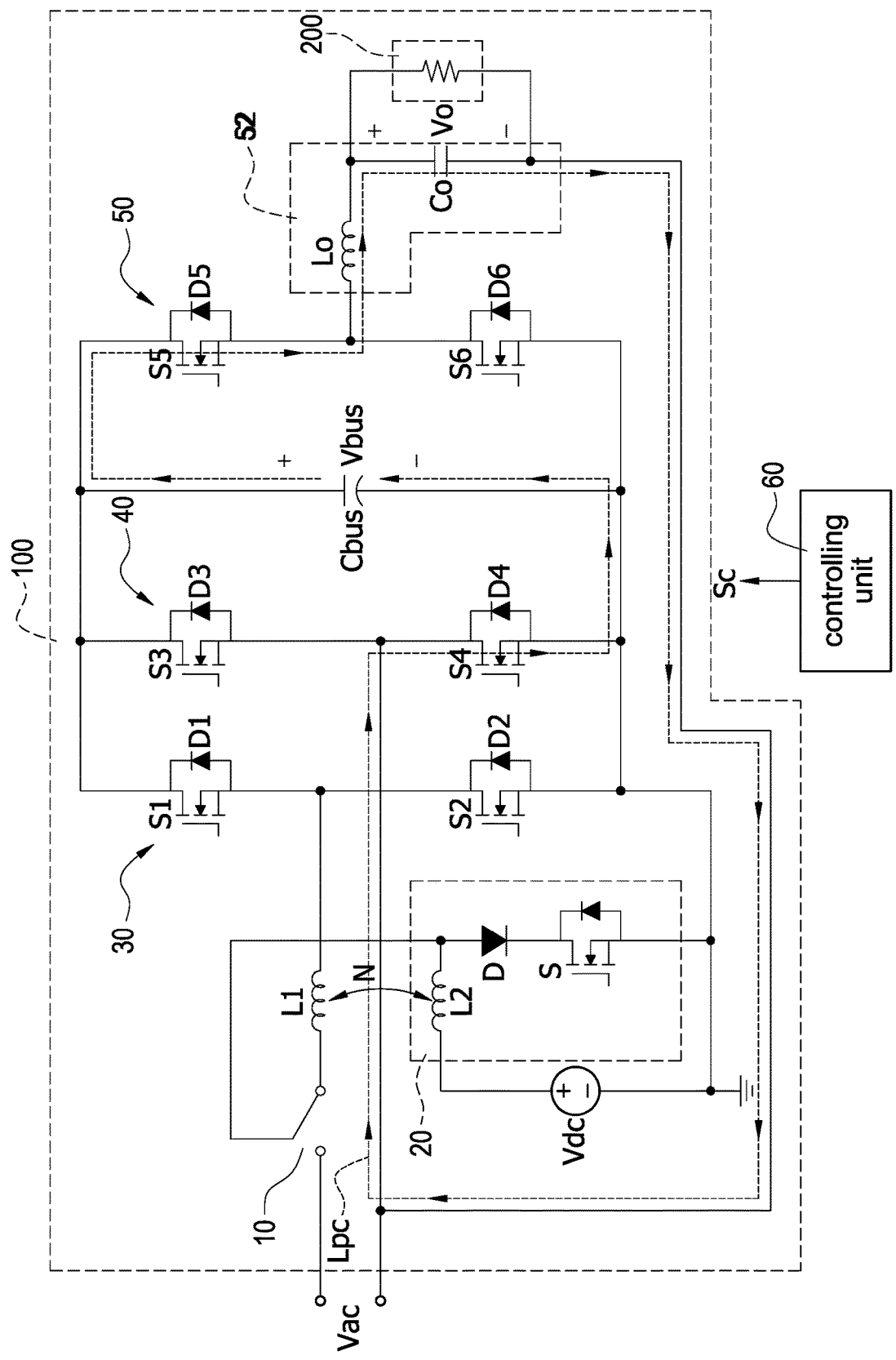
FIG. 4A is an equivalent diagram of the uninterruptible power supply apparatus under a positive half-cycle first loop according to the 1st embodiment of the present disclosure.

FIG. 4A is an equivalent diagram of the uninterruptible power supply apparatus under a positive half-cycle first loop according to the 1st embodiment of the present disclosure. In FIG. 1 and FIG. 4A, the controlling unit 60 outputs the controlling signals Sc for controlling the second bridge arm 40 and the third bridge arm 50 to convert the bus voltage Vbus to the output voltage Vo for providing to the load 200 by the inverter module constituted of the second bridge arm 40 and the third bridge arm 50. As can be shown in FIG. 4A, during the output voltage Vo is in the positive half-cycle, a positive half-cycle first loop Lpc is established and sequentially formed by the first terminal of the bus capacitor Cbus, the fifth switch S5, the outputting circuit 52 (in the exemplary embodiment of the present disclosure, the outputting circuit 52 is a filtering circuit constituted of the outputting inductor Lo and the outputting capacitor Co), the fourth switch S4, and finally return to the second terminal of the bus capacitor Cbus.

Figure 4B:
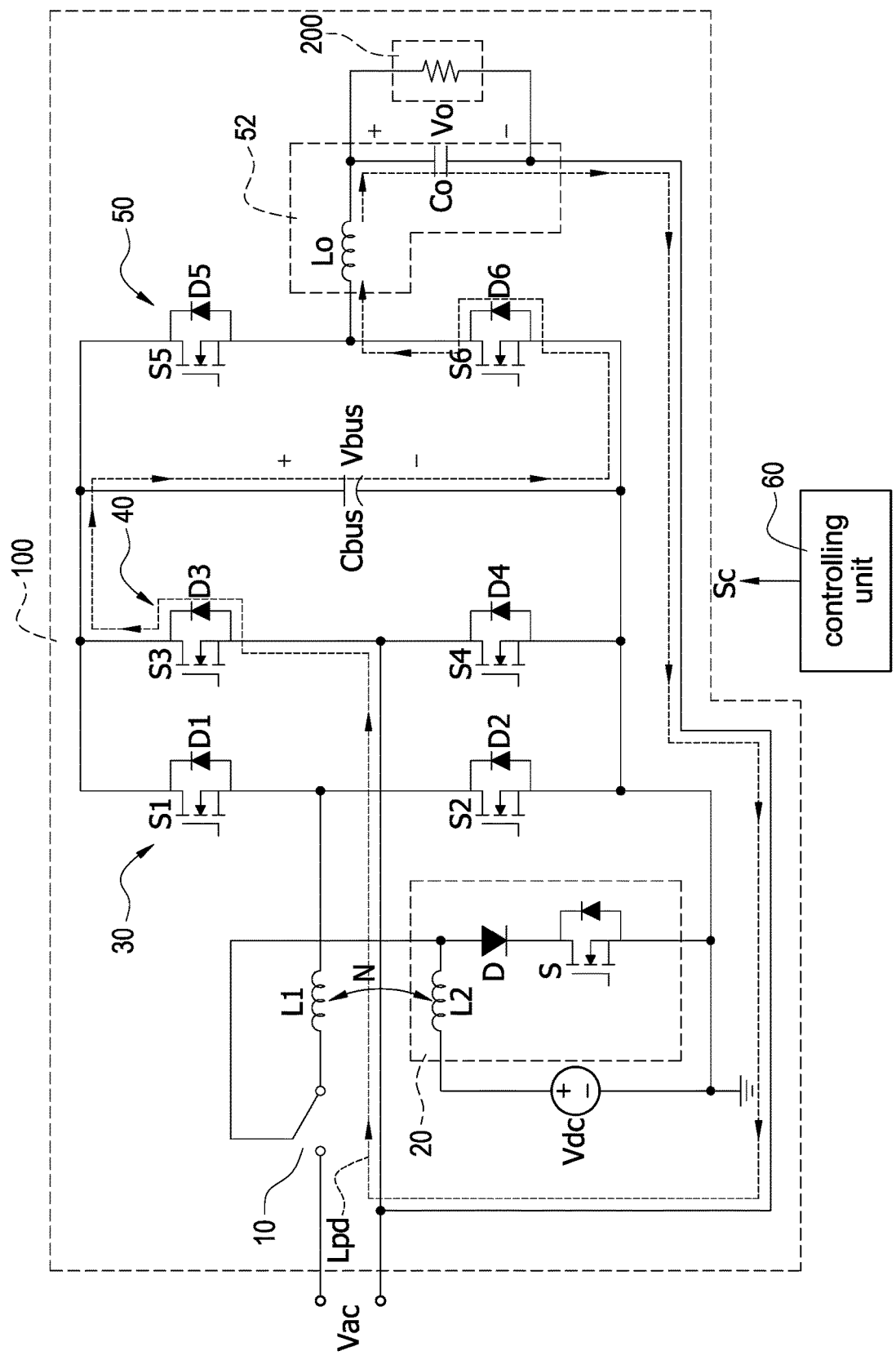
FIG. 4B is an equivalent diagram of the uninterruptible power supply apparatus under a positive half-cycle second loop according to the 1st embodiment of the present disclosure.

FIG. 4B is an equivalent diagram of the uninterruptible power supply apparatus under a positive half-cycle second loop according to the 1st embodiment of the present disclosure. In FIG. 1, FIG. 4A, and FIG. 4B, a positive half-cycle second loop Lpd is established during the output voltage Vo is in the positive half-cycle. The positive half-cycle second loop Lpd is sequentially formed by the outputting circuit 52 (in the exemplary embodiment of the present disclosure, the outputting circuit 52 is a filtering circuit constituted of the outputting inductor Lo and the outputting capacitor Co), the third diode D3, the bus capacitor Cbus, the sixth diode D6, and finally return to the outputting circuit 52.

Figure 4C:
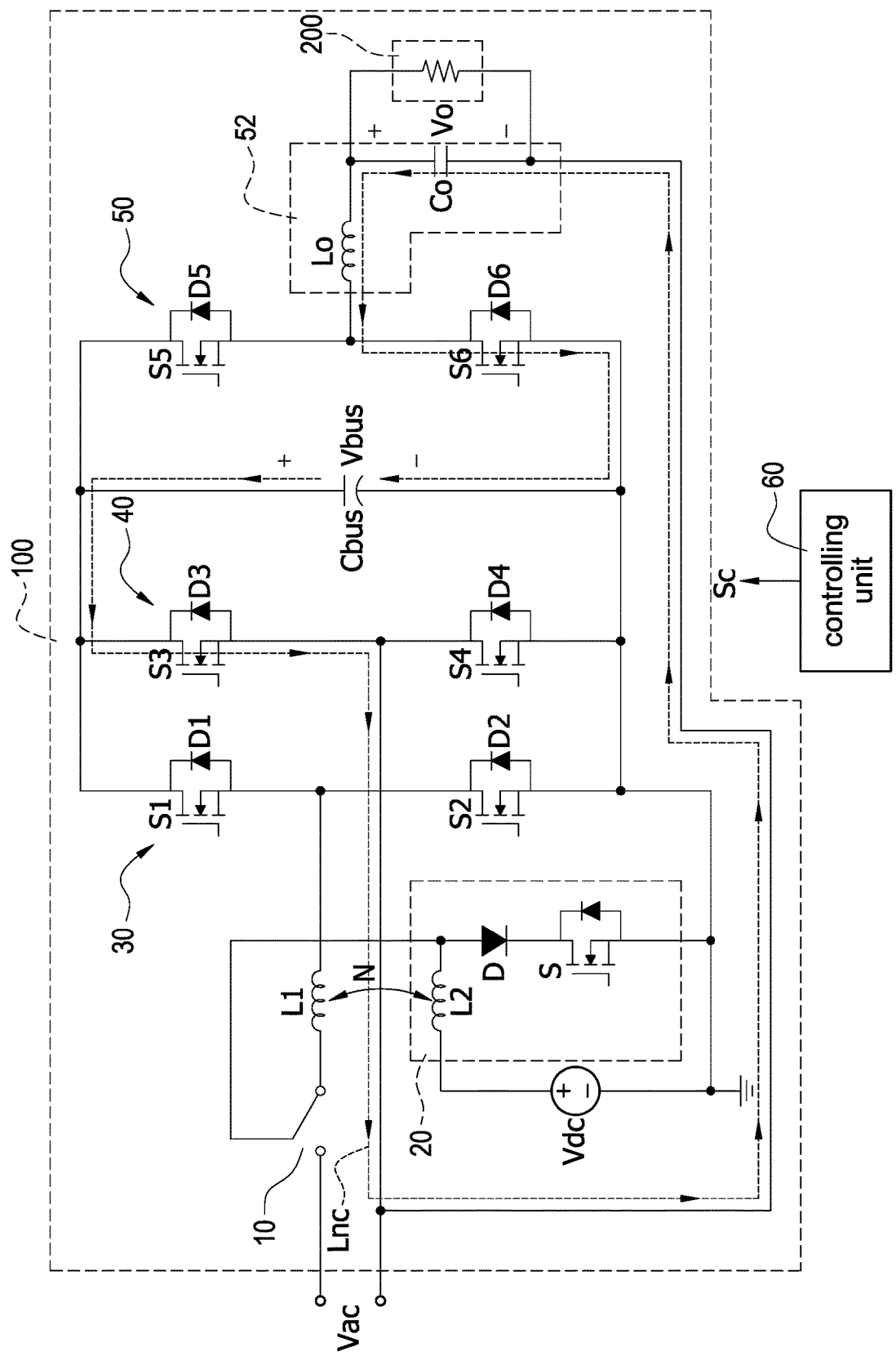
FIG. 4C is an equivalent diagram of the uninterruptible power supply apparatus under a negative half-cycle first loop according to the 1st embodiment of the present disclosure.

FIG. 4C is an equivalent diagram of the uninterruptible power supply apparatus under a negative half-cycle first loop according to the 1st embodiment of the present disclosure. In FIG. 1 and FIG. 4A to FIG. 4C, a negative half-cycle first loop Lnc is established during the output voltage Vo is in the negative half-cycle. The negative half-cycle first loop Lnc is sequentially formed by the first terminal of the bus capacitor Cbus, the third switch S3, the outputting circuit 52 (in the exemplary embodiment of the present disclosure, the outputting circuit 52 is a filtering circuit constituted of the outputting inductor Lo and the outputting capacitor Co), the sixth switch S6, and finally return to the second terminal of the bus capacitor Co.

Figure 4D:
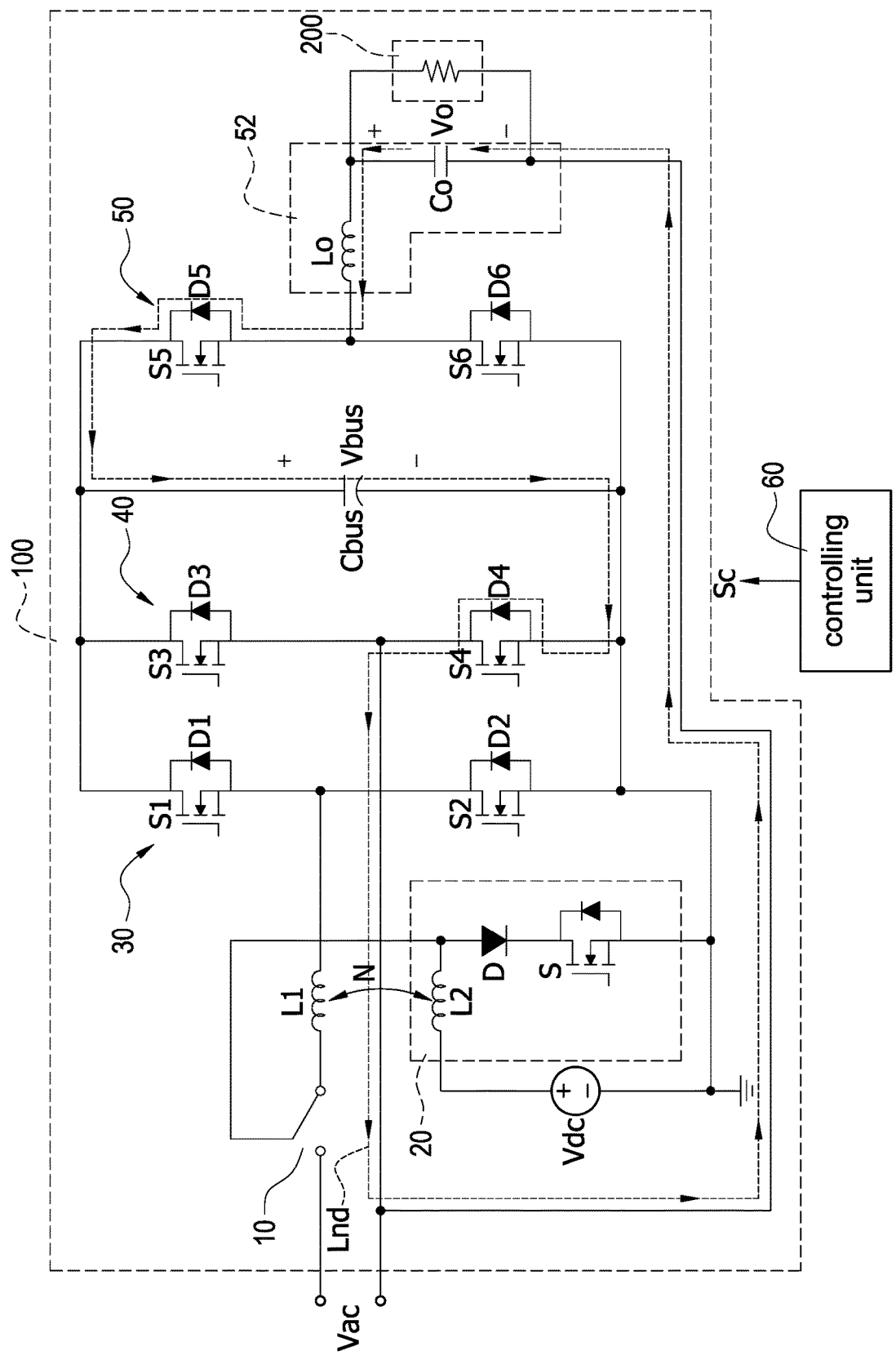
FIG. 4D is an equivalent diagram of the uninterruptible power supply apparatus under a negative half-cycle second loop according to the 1st embodiment of the present disclosure.

FIG. 4D is an equivalent diagram of the uninterruptible power supply apparatus under a negative half-cycle second loop according to the 1st embodiment of the present disclosure. In FIG. 1 and FIG. 4A to FIG. 4D, a negative half-cycle second loop Lnd is established during the output voltage Vo is in the negative half-cycle. The negative half-cycle second loop Lnd is sequentially formed by the outputting circuit 52 (in the exemplary embodiment of the present disclosure, the outputting circuit 52 is a filtering circuit constituted of the outputting inductor Lo and the outputting capacitor Co), the fifth diode D5, the bus capacitor Cbus, the fourth diode D4, and finally return to the outputting circuit 52.

Figure 5:
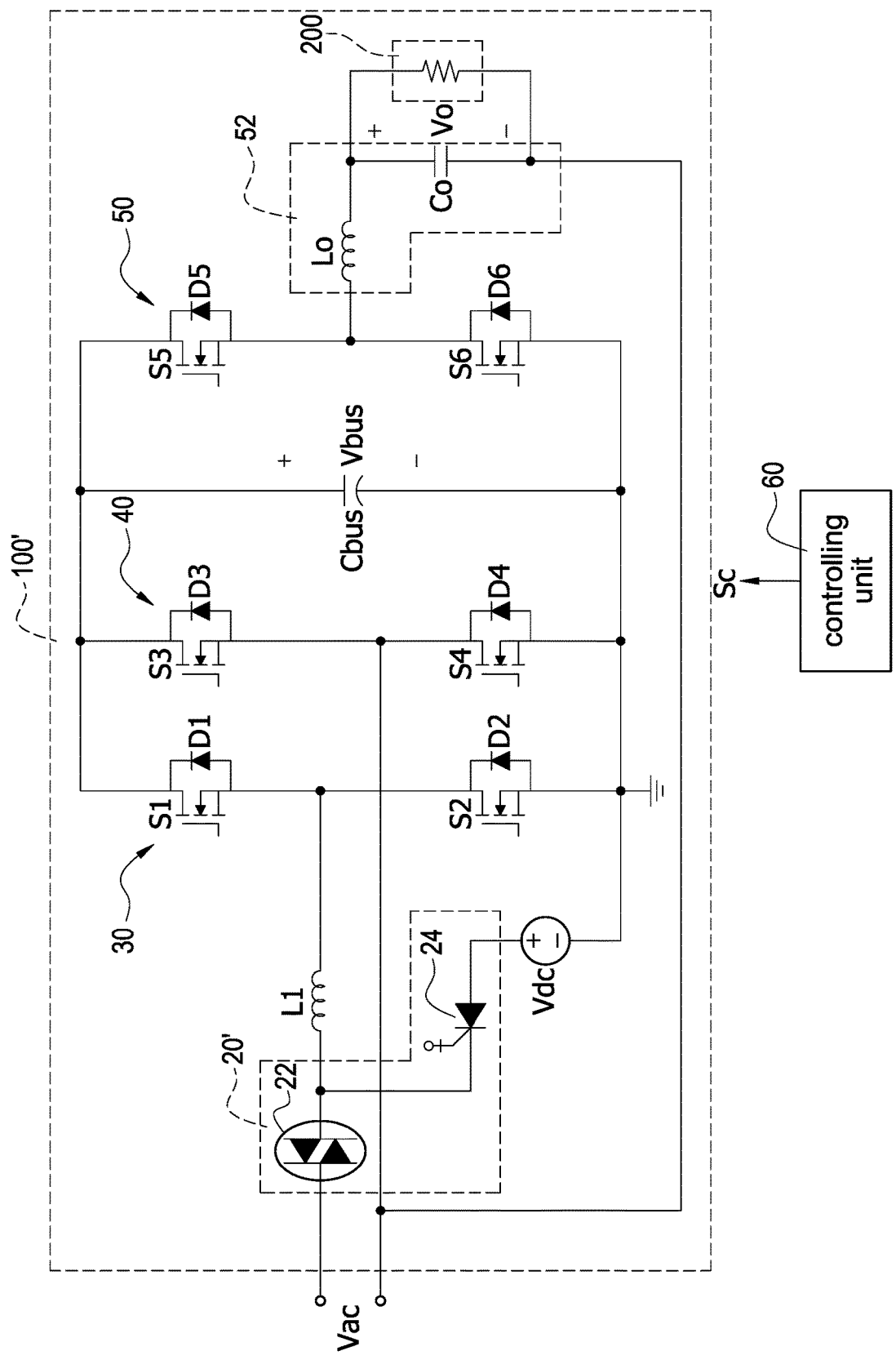
FIG. 5 is a circuit block diagram of an uninterruptible power supply apparatus according to a 2nd embodiment of the present disclosure.
Figure 6A:
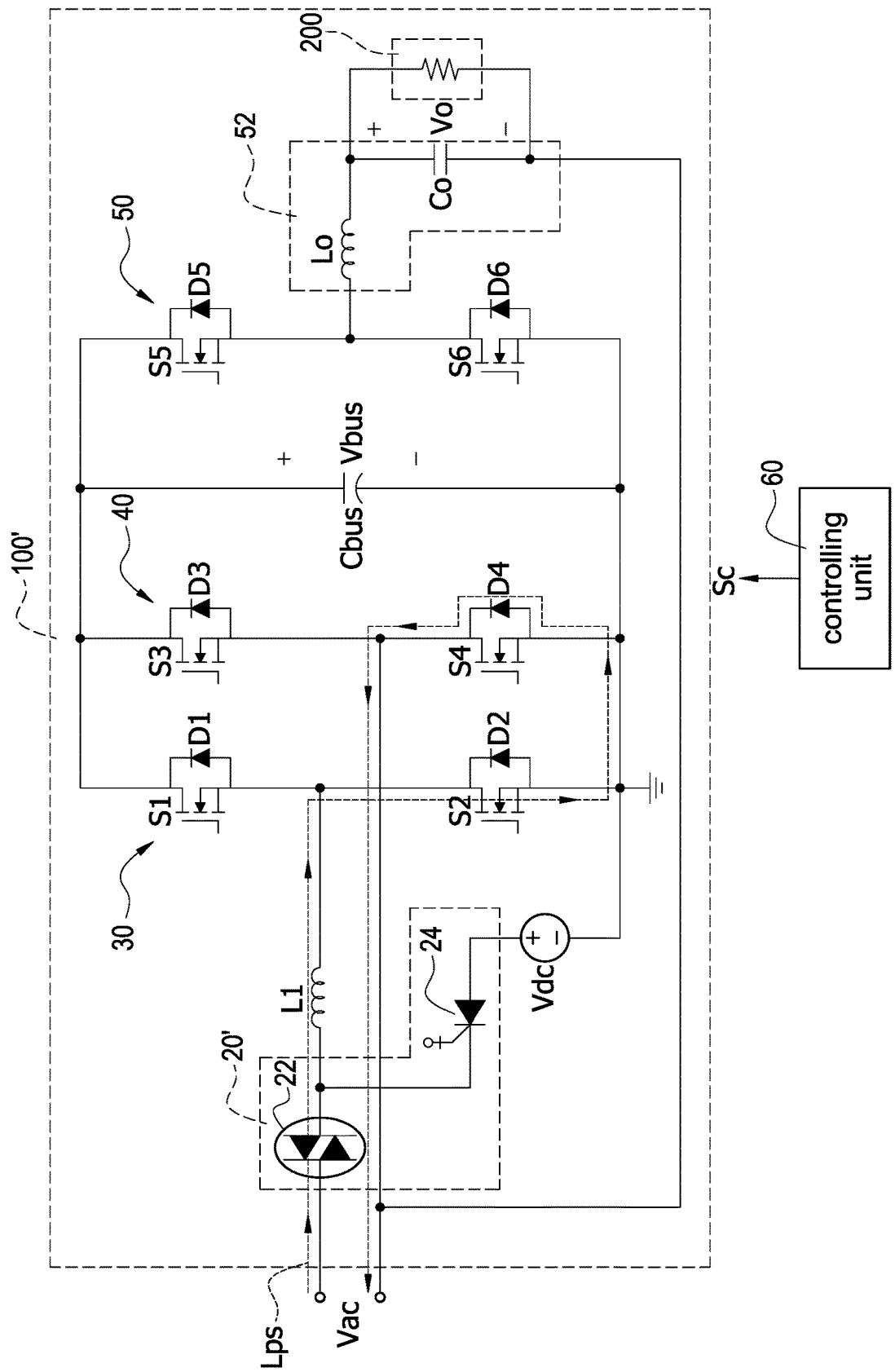
FIG. 6A is an equivalent diagram of the uninterruptible power supply apparatus under a positive half-cycle energy-storing loop according to the 2nd embodiment of the present disclosure.
Figure 6B:
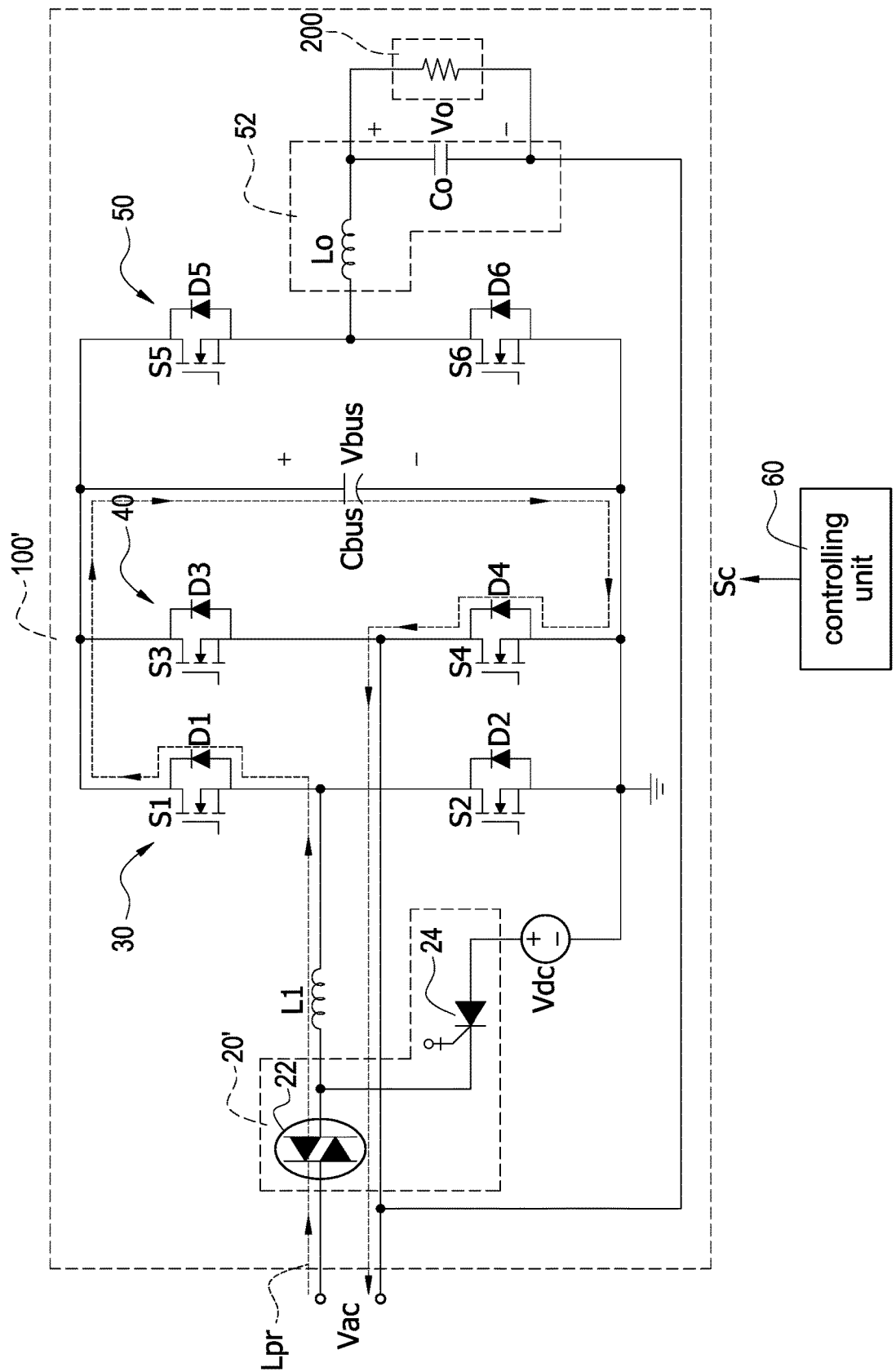
FIG. 6B is an equivalent diagram of the uninterruptible power supply apparatus under a positive half-cycle energy-releasing loop according to the 2nd embodiment of the present disclosure.
Figure 6C:
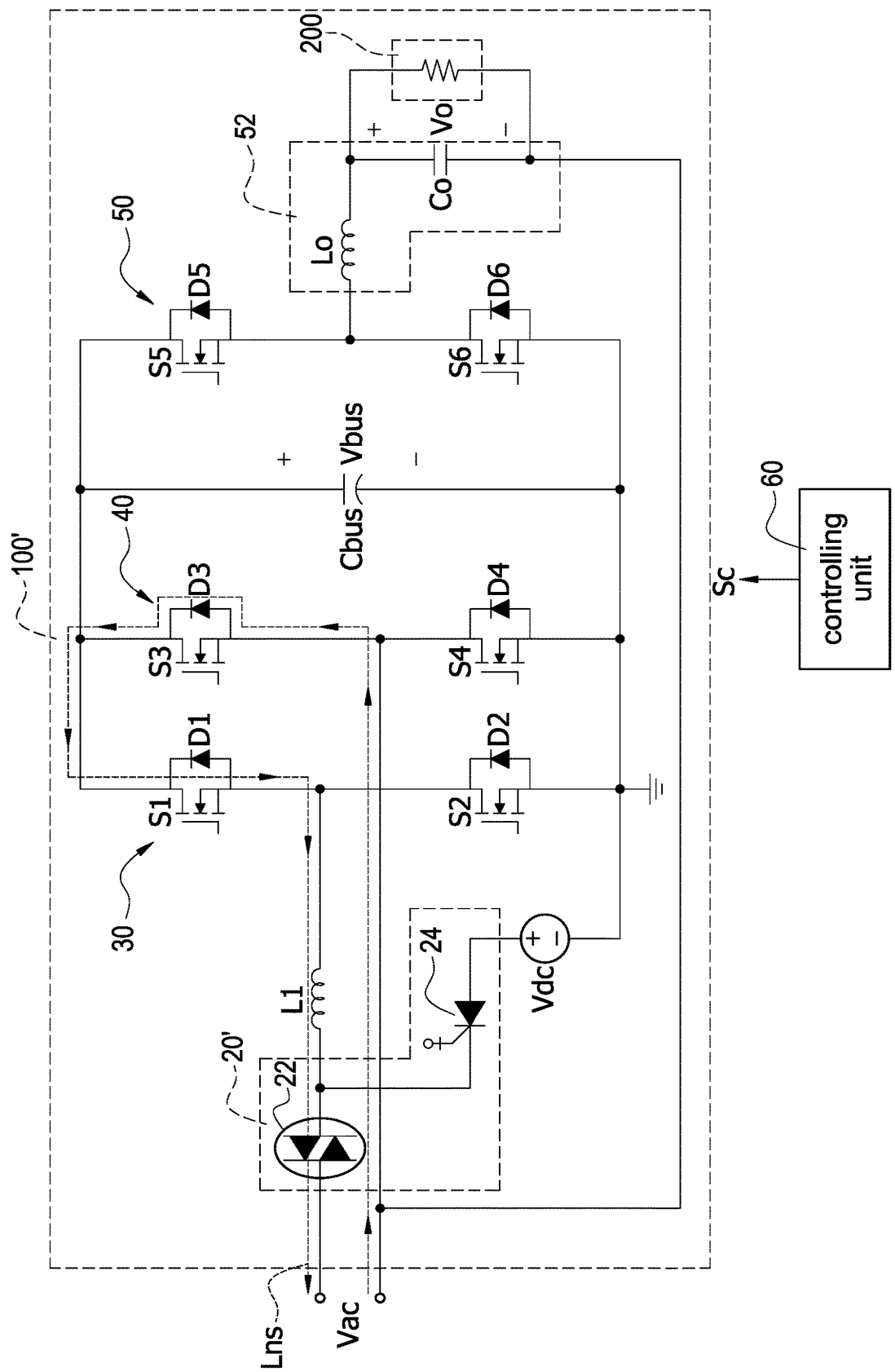
FIG. 6C is an equivalent diagram of the uninterruptible power supply apparatus under a negative half-cycle energy-storing loop according to the 2nd embodiment of the present disclosure.
Figure 6D:
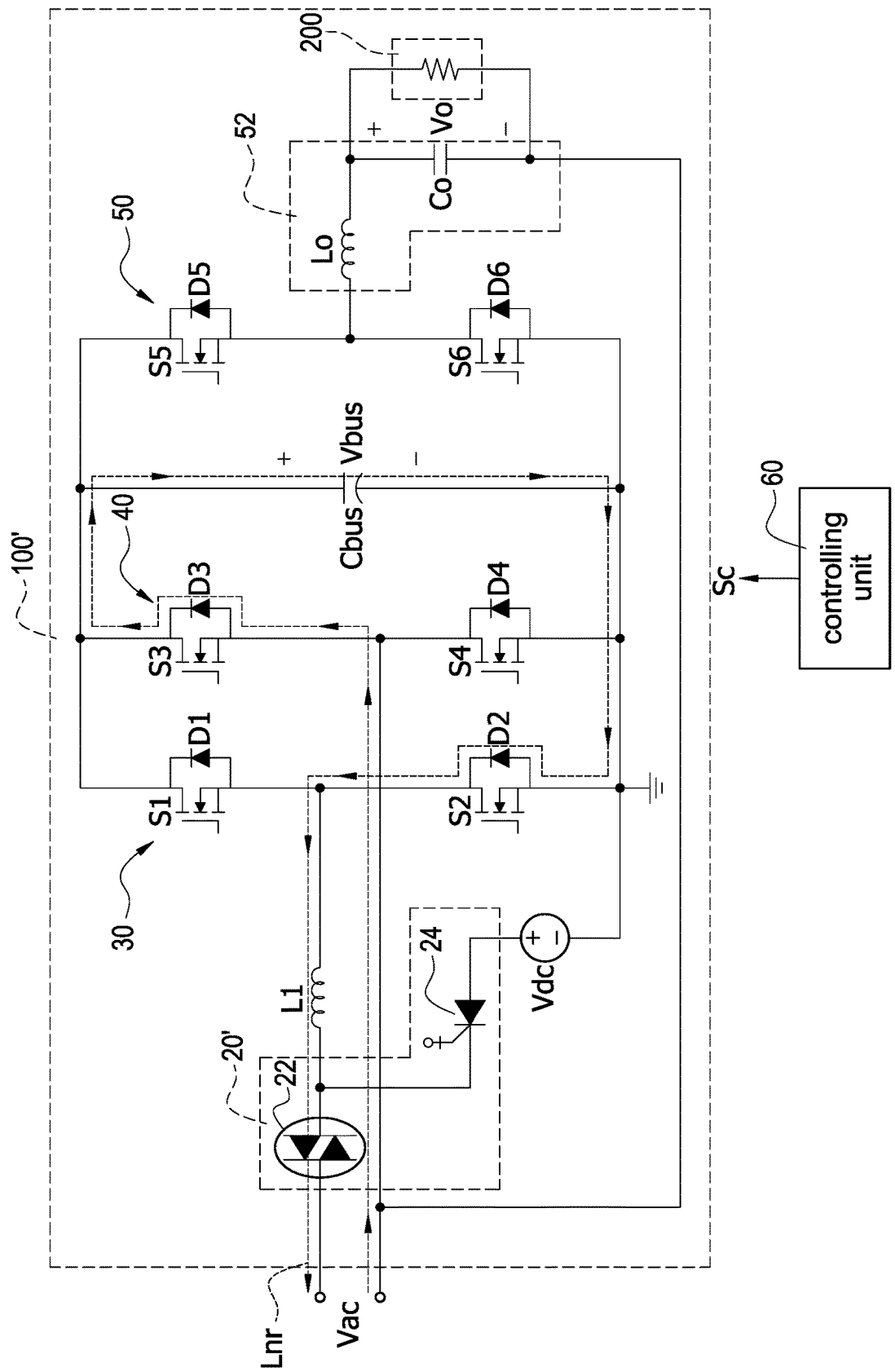
FIG. 6D is an equivalent diagram of the uninterruptible power supply apparatus under a negative half-cycle energy-releasing loop according to the 2nd embodiment of the present disclosure.

FIG. 5 is a circuit block diagram of an uninterruptible power supply apparatus according to a 2nd embodiment of the present disclosure. The uninterruptible power supply apparatus 100' according to this embodiment is similar to that of the first embodiment shown in FIG. 1 mentioned above. The difference is that the switch 10 and the DC controlling unit 20 of the first embodiment is replaced with a DC controlling unit 20' in this embodiment. The DC controlling unit 20' is coupled to an AC voltage Vac, a DC voltage Vdc, and a first inductor L1, and a controlling unit 60 make the first inductor L1 be selectively connected to the AC voltage Vac or the DC voltage Vdc by controlling the DC controlling unit 20'. More particularly, the controlling unit 60 controls the DC controlling unit 20' to make the AC voltage Vac be selectively coupled to the first inductor L1 and the DC voltage Vdc be selectivity decoupled to the first inductor L1 during the AC voltage Vac is supplied to the uninterruptible power supply apparatus 100'. The uninterruptible power supply apparatus 100' converts the AC voltage Vac to a bus voltage Vbus during the AC voltage Vac is coupled to the first inductor L1. On the contrast, the controlling unit 60 controls the DC controlling unit 20' to make the AC voltage Vac be decoupled to the first inductor L1 and the DC voltage Vdc be selectivity coupled to the first inductor L1 during the AC voltage Vac is not supplied to the uninterruptible power supply apparatus 100'. The uninterruptible power supply apparatus 100' convert the DC voltage Vdc to the bus voltage Vbus during the DC voltage Vdc is coupled to the first inductor L1.

In detail, the DC controlling unit 20' includes a first power switch 22 and a second power switch 24. A first terminal of the first power switch 22 is coupled to the line wire of the AC voltage Vac, and a second terminal of the first power switch 22 is coupled to a first terminal of the first inductor L1. A first terminal of the second power switch 24 is coupled to the second terminal of the first power switch 22 and the first terminal of the first inductor L1, and a second terminal of the second power switch 24 is coupled to the positive terminal of the DC voltage Vdc. The controlling unit 60 is configured to turn-on the first power switch 22 and turn-off the second power switch 24 during the AC voltage Vac is supplied to the uninterruptible power supply apparatus 100'. The uninterruptible power supply apparatus 100' converts the AC voltage Vac to the bus voltage Vbus since the line wire of the AC voltage Vac is coupled to the first inductor L1 and the positive terminal of the DC voltage Vdc is not coupled to the first inductor L1.

The controlling unit 60 is configured to turn-off the first power switch 22 and turn-on the second power switch 24 during the AC voltage Vac is not supplied to the uninterruptible power supply apparatus 100'. The uninterruptible power supply apparatus 100' converts the DC voltage Vdc to the bus voltage Vbus since the line wire of the AC voltage Vac is not coupled to the first inductor L1 and the positive terminal of the DC voltage Vdc is coupled to the first inductor L1. The function and relative description of the first inductor L1, a first bridge arm 30, a second bridge arm 40, the bus capacitor Cbus, and a third bridge arm 50 respectively shown in FIG. 5 are the same as that shown in FIG. 1 mentioned above and are not repeated here for brevity.

Notably, in this embodiment, the first power switch 22 may be, but not limited to, a triode for alternating current (TRIAC), and the second power switch 24 may be, but not limited to, a silicon controlled rectifier (SCR). The controlling unit 60 may output controlling signals for controlling the gate of the TRIAC and the SCR for conducting or non-conducting the TRIAC and the SCR, respectively. In this embodiment, the TRIAC and the SCR may be not controlled by the controlling unit 60, for example, the TRIAC and the SCR may be, but not limited to, conducted or non-conducted in a self-driving manner.

The first inductor L1 and the first bridge arm 30 collectively constitute a DC to DC power conversion module, and the controlling unit 60 is configured to control the DC to DC power conversion module to convert the DC voltage Vdc to the bus voltage Vbus. In detail, the controlling unit 60 is configured to control the DC controlling unit 20' to conduct the DC voltage Vdc to the first inductor L1 during the AC voltage Vac is not supplied to the uninterruptible power supply apparatus 100'. At the time, the uninterruptible power supply apparatus 100' converts the DC voltage Vdc to the bus voltage Vbus by the DC to DC power conversion module constituted of the first inductor L1 and the first bridge arm 30. The function and relative description of an AC to DC power conversion module (constituted of the first inductor L1, the first bridge arm 30 and the second bridge arm 40) and an inverter module (constituted of the second bridge arm 40 and the third bridge arm 50) respectively shown in FIG. 5 are the same as that shown in FIG. 1 mentioned above and are not repeated here for brevity. The AC to DC power conversion module and the inverter module in this embodiment can achieve the functions as the AC to DC power conversion module and the inverter module in the 1st embodiment does.

In this embodiment, uninterruptible power supply apparatus 100' is constituted of the AC to DC power conversion module, the DC to DC power conversion module, and the inverter module as mentioned in the 1st embodiment. By the first inductor L1 and the first switch S1 collectively employed in the AC to DC power conversion module and the DC to DC power conversion module, and the third switch S3 and the fourth switch S4 collectively employed in the AC to DC power conversion module and the inverter module, the uninterruptible power supply apparatus of the present disclosure features of reducing the component number, so that the utilization rate of the components is enhanced.

FIG. 6A to FIG. 6D are respectively equivalent diagrams of the uninterruptible power supply apparatus under a positive half-cycle energy-storing loop, a positive half-cycle energy-releasing loop, a negative half-cycle energy-storing loop, and a negative half-cycle energy-releasing loop according to the 2nd embodiment of the present disclosure. In FIG. 5 and FIG. 6A to FIG. 6D, the controlling unit 60 outputs the controlling signals Sc for controlling the DC controlling unit 20' to selectively connected the AC voltage Vac to the first inductor L1 during the AC voltage Vac is supplied to the uninterruptible power supply apparatus 100'. At the time, the controlling unit 60 also outputs the controlling signals Sc for controlling the first bridge arm 30 and the second bridge arm 40 to convert the AC voltage Vac to the bus voltage Vbus by the AC to DC power conversion module constituted of the first bridge arm 30 and the second bridge arm 40. The function and relative description of current paths of the positive half-cycle energy-storing loop, the positive half-cycle energy-releasing loop, the negative half-cycle energy-storing loop, and the negative half-cycle energy-releasing loop respectively shown in FIG. 6A to FIG. 6D are the same as that shown in FIG. 2A to FIG. 2D mentioned above and are not repeated here for brevity.

Figure 7A:
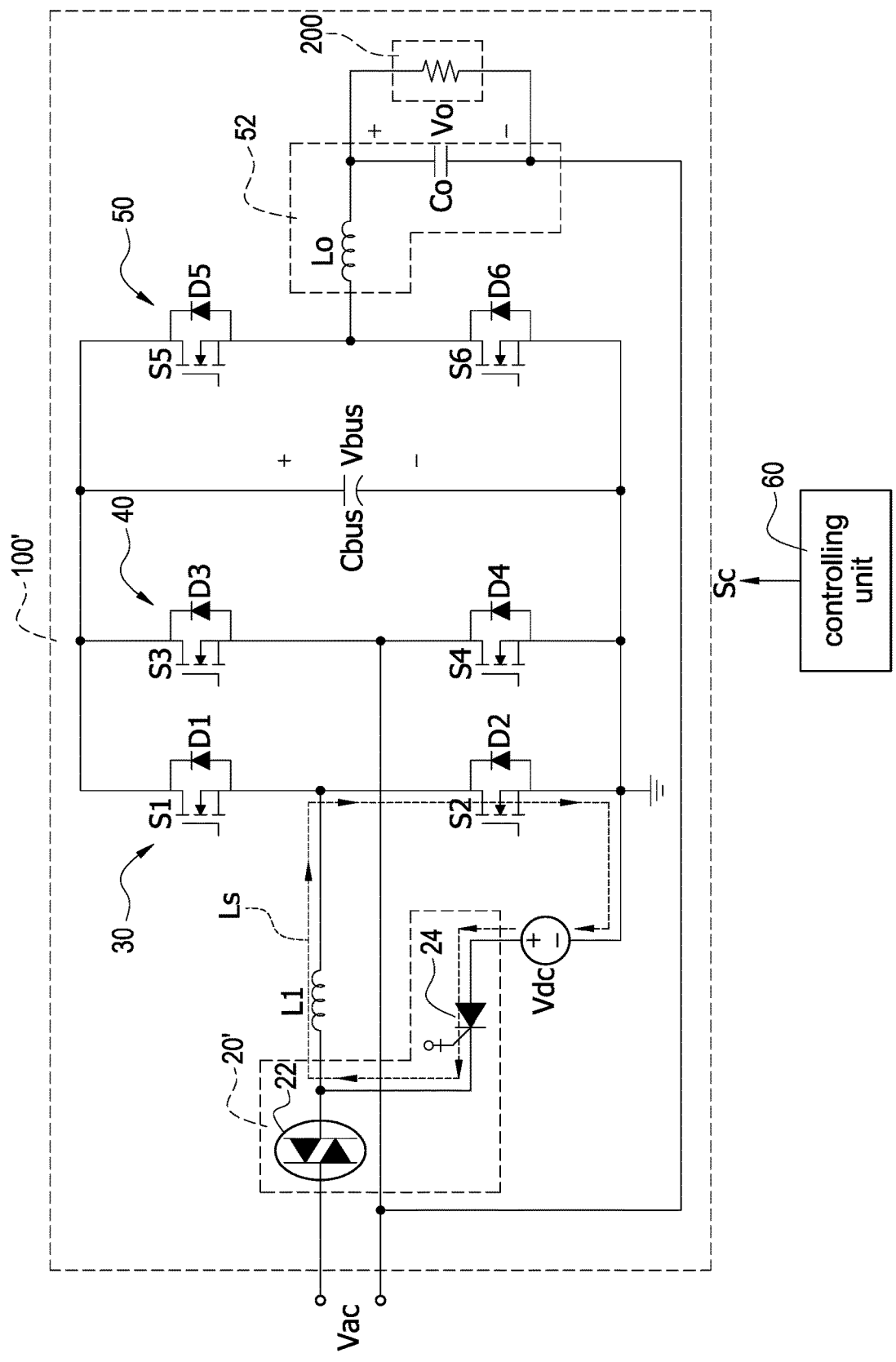
FIG. 7A is an equivalent diagram of the uninterruptible power supply apparatus under an energy-storing loop according to the 2nd embodiment of the present disclosure.

FIG. 7A is an equivalent diagram of the uninterruptible power supply apparatus under an energy-storing loop according to the 2nd embodiment of the present disclosure. In FIG. 5 and FIG. 7A, the controlling unit 60 outputs the controlling signals Sc for controlling the DC controlling unit 20' to selectively connected the DC voltage Vdc to the first inductor L1 through the DC controlling unit 20 during the AC voltage Vac is not supplied to the uninterruptible power supply apparatus 100'. At the time, the controlling unit 60 also outputs the controlling signals Sc for controlling the first bridge arm 30 to convert the DC voltage Vdc to the bus voltage Vbus through the DC to DC power conversion module constituted of the first inductor L1 and the first bridge arm 30. The energy-storing loop Ls is established during the AC voltage Vac is not supplied to the uninterruptible power supply apparatus 100', the second switch S2 is turned on by the controlling unit 60, and the first inductor L1 is charged by the DC voltage Vdc. The energy-storing loop Ls is sequentially formed by the positive terminal of the DC voltage Vdc, the second power switch 24, the first inductor L1, the second switch S2, and finally return to the negative terminal of the DC voltage Vdc.

Figure 7B:
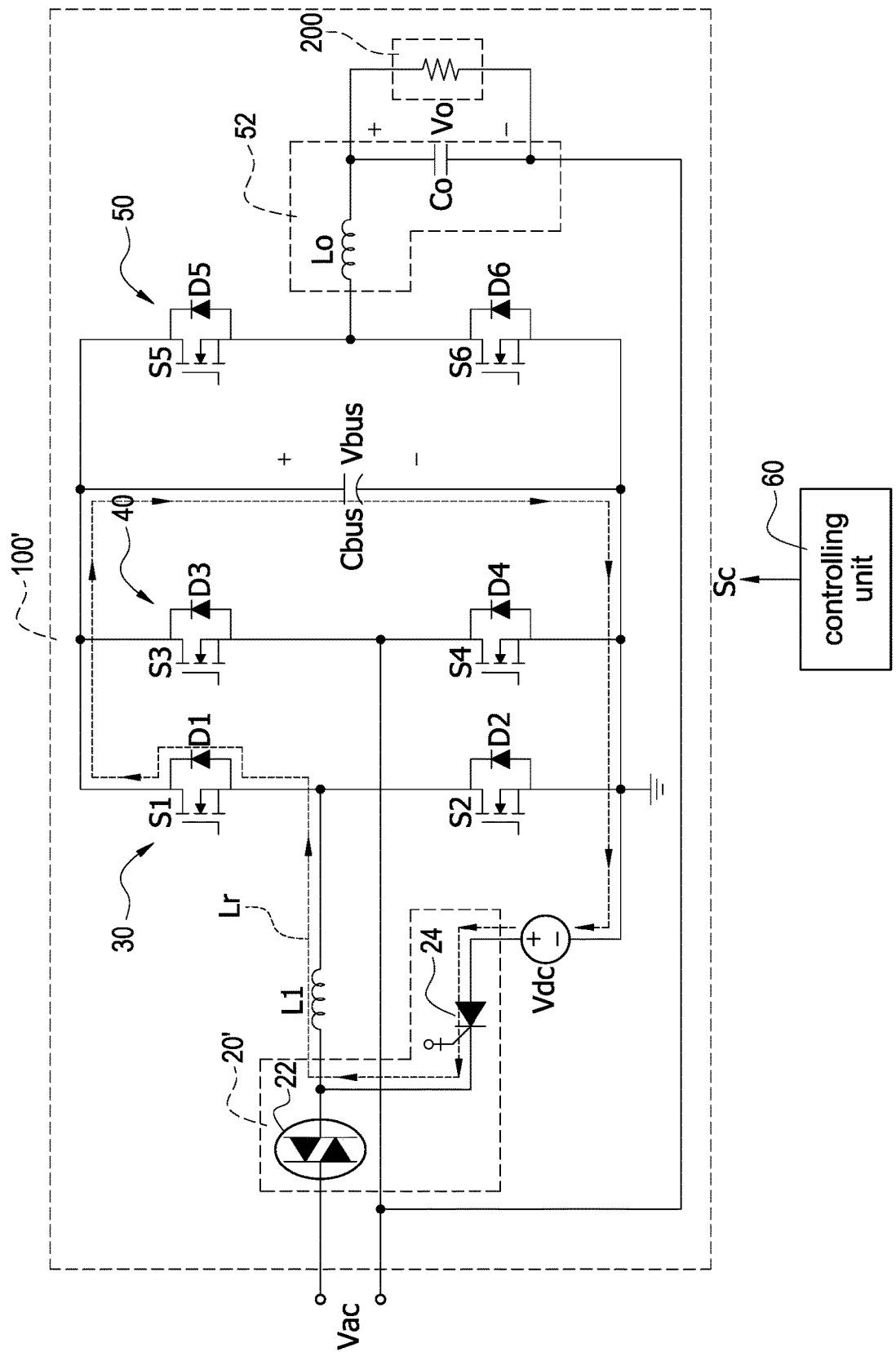
FIG. 7B is an equivalent diagram of the uninterruptible power supply apparatus under an energy-releasing loop according to the 2nd embodiment of the present disclosure.
Figure 8A:
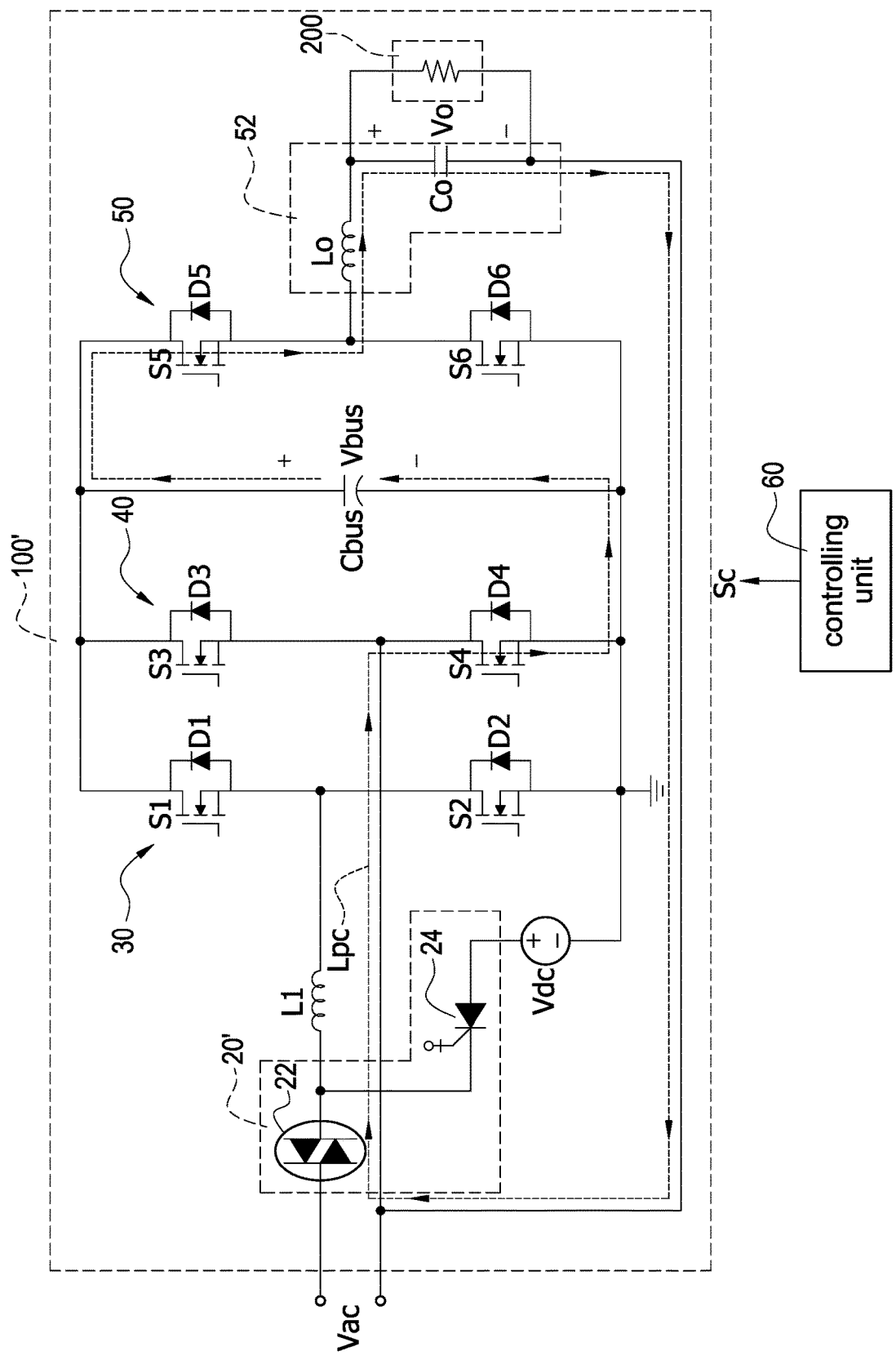
FIG. 8A is an equivalent diagram of the uninterruptible power supply apparatus under a positive half-cycle first loop according to the 2nd embodiment of the present disclosure.
Figure 8B:
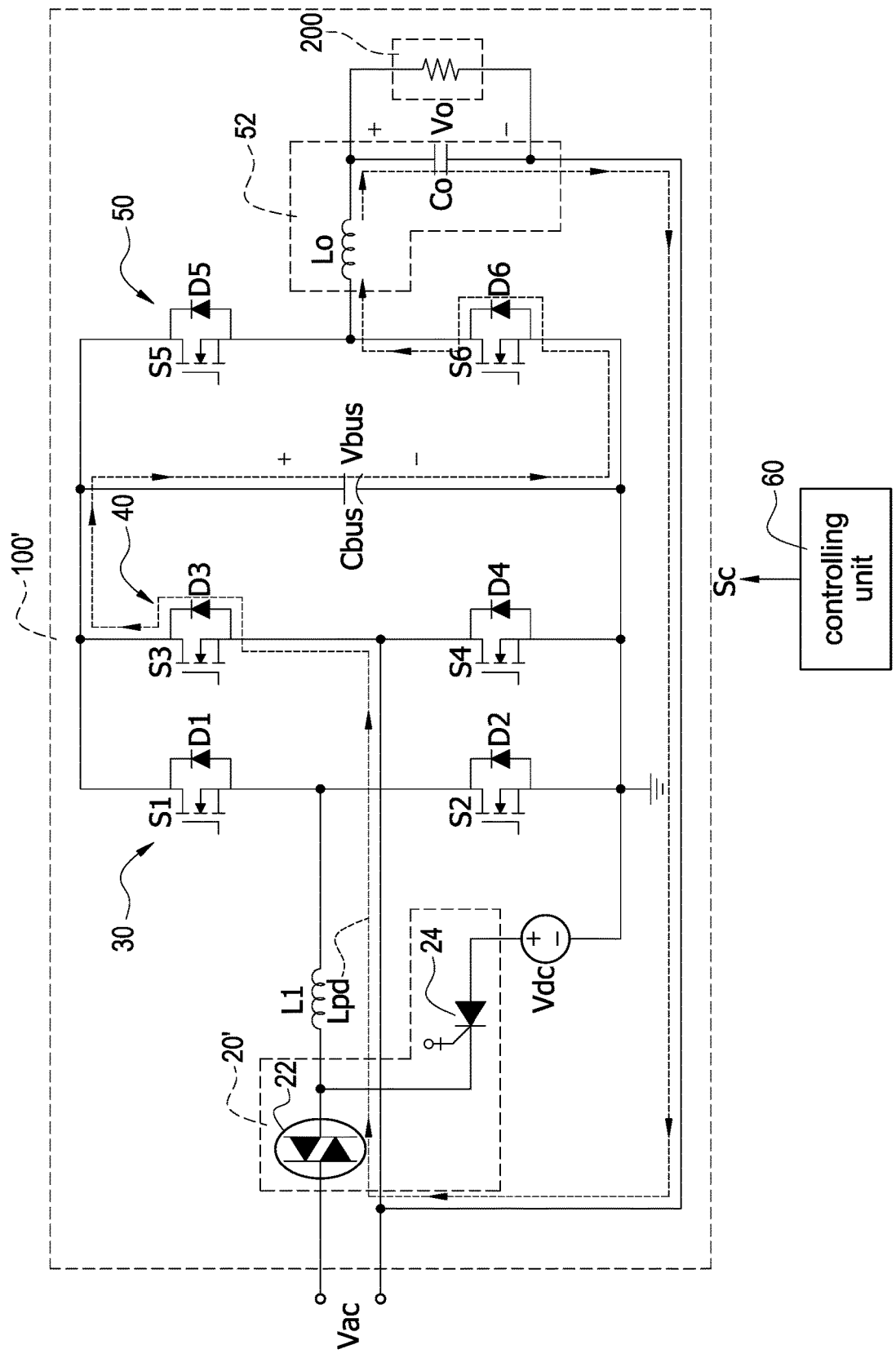
FIG. 8B is an equivalent diagram of the uninterruptible power supply apparatus under a positive half-cycle second loop according to the 2nd embodiment of the present disclosure.
Figure 8C:
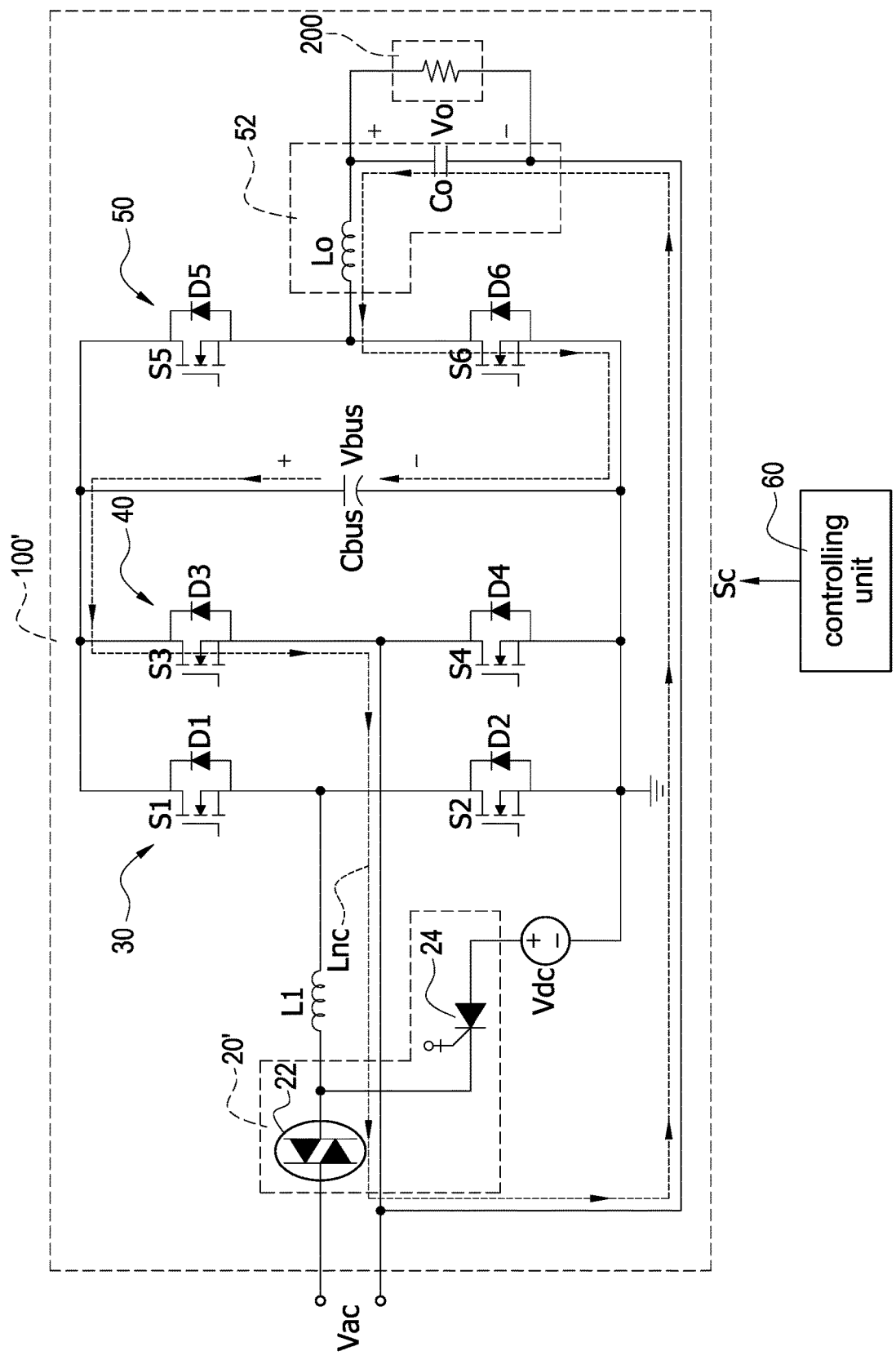
FIG. 8C is an equivalent diagram of the uninterruptible power supply apparatus under a negative half-cycle first loop according to the 2nd embodiment of the present disclosure.
Figure 8D:
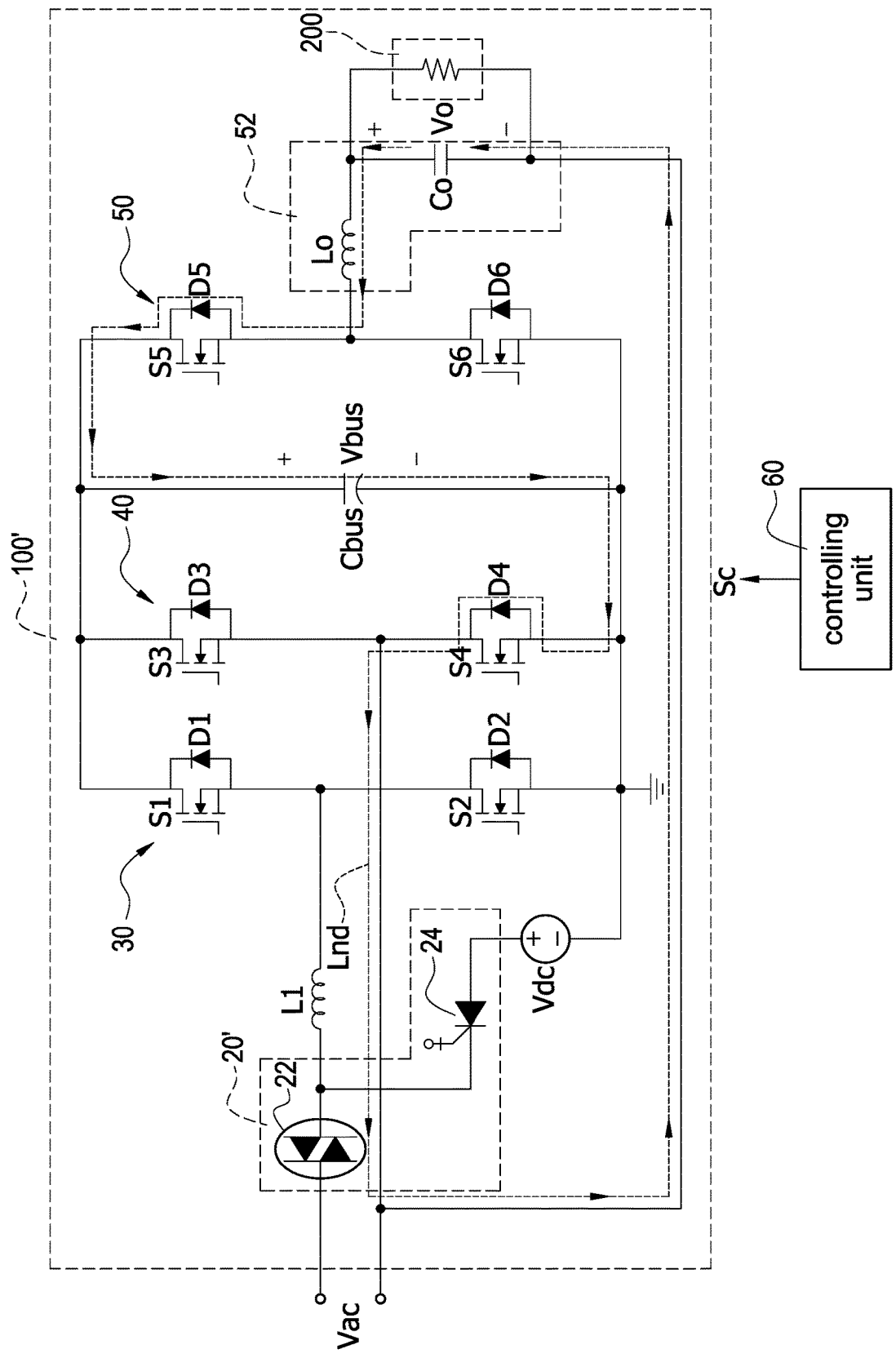
FIG. 8D is an equivalent diagram of the uninterruptible power supply apparatus under a negative half-cycle second loop according to the 2nd embodiment of the present disclosure.

FIG. 7B is an equivalent diagram of the uninterruptible power supply apparatus under an energy-releasing loop according to the 2nd embodiment of the present disclosure. In FIG. 5, FIG. 7A, and FIG. 7B, the energy-releasing loop Lr is established during the AC voltage Vac is not supplied to the uninterruptible power supply apparatus 100', the second switch S2 is turned off by the controlling unit 60, and the first inductor L1 discharges through the bus capacitor Cbus. The energy-releasing loop Lr is sequentially formed by the positive terminal of the DC voltage Vdc, the second power switch 24, the first inductor L1, the first diode D1, the bus capacitor Cbus, and finally return to the negative terminal of the DC voltage Vdc.

FIG. 8A to FIG. 8D are respectively equivalent diagrams of the uninterruptible power supply apparatus under a positive half-cycle first loop, a positive half-cycle second loop, a negative half-cycle first loop, and a negative half-cycle second loop according to the 2nd embodiment of the present disclosure. In FIG. 5 and FIG. 8A to FIG. 8D, the controlling unit 60 outputs the controlling signals Sc for controlling the second bridge arm 40 and the third bridge arm 50 to convert the bus voltage Vbus to the output voltage Vo for providing to the load 200 by the inverter module constituted of the second bridge arm 40 and the third bridge arm 50. The function and relative description of the current paths of the positive half-cycle first loop, the positive half-cycle second loop, the negative half-cycle first loop, and the negative half-cycle second loop respectively shown in FIG. 8A to FIG. 8D are the same as that shown in FIG. 4A to FIG. 4D mentioned above and are not repeated here for brevity.

As mentioned above, the uninterruptible power supply apparatus of each of the embodiments of the present disclosure at least have one of the following advantages or other advantages.

1. In the uninterruptible power supply apparatus of the present disclosure, the same components can be used in both the AC to DC power conversion module and the DC to DC power conversion module, and the other same components can be used in both the AC to DC power conversion module and the inverter module, which features of reducing the component number, so that the circuit cost is reduced;

2. The uninterruptible power supply apparatus of the present disclosure uses less components, which features of lowering power consumption, so that the overall efficiency is improved;

3. In the present disclosure, the AC to DC power conversion module, the DC to DC power conversion, and the inverter module are integrated together to form the uninterruptible power supply apparatus, which features of reducing the component number, so that the component controlled by the controlling unit is reduced to lower the possibility of damage of components. Furthermore, the stability is improved; and 4. The uninterruptible power supply apparatus of the present disclosure using the coupled inductor constituted of the first inductor and the second inductor, such that the voltage stress of the first inductor is reduced, which features that specification and size of the first inductor is reduced.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. An uninterruptible power supply apparatus with shared electronic components, comprising:
    a switch coupled to an alternative current (AC) power;
    a first inductor coupled to the switch;
    a direct current (DC) controlling unit coupled to a DC power and the switch;
    a first bridge arm coupled to the first inductor, and the first bridge arm comprising:
        a first switch connected in parallel to a first diode, and coupled to the first inductor; and
        a second switch connected in parallel to a second diode, and coupled to the first inductor;
    a second bridge arm connected in parallel with the first bridge arm;
    a bus capacitor connected in parallel with the second bridge arm, and a first terminal of the bus capacitor coupled to the first switch, a second terminal of the bus capacitor coupled to the second switch; and
    a third bridge arm connected in parallel with the second bridge arm,
    wherein the AC power is converted to a bus voltage through the first inductor, the first bridge arm and the second bridge arm, and the bus voltage is stored on the bus capacitor, and then the bus voltage is converted to an output power through the second bridge arm and the third bridge arm when the switch is switched to connect the first inductor to the AC power; the DC power is converted to the bus voltage through the DC controlling unit and the first inductor, and then converted to the output power through the second bridge arm and the third bridge arm when the switch is switched to connect the first inductor to the DC controlling unit;
    the DC controlling unit is under an energy-releasing operation through an energy-releasing loop sequentially formed by the DC power, the DC controlling unit, the first inductor, the first diode, the bus capacitor and the DC power.

2. The uninterruptible power supply apparatus with shared electronic components of claim 1, wherein the second bridge arm comprises:
    a third switch connected in parallel with a third diode, wherein a first terminal of the third switch is coupled to the first terminal of the bus capacitor and the AC power; and
    a fourth switch connected in parallel with a fourth diode, and coupled to the AC power and the second terminal of the bus capacitor.

3. The uninterruptible power supply apparatus with shared electronic components of claim 2, wherein the first inductor is under an energy-storing operation through a positive half-cycle energy-storing loop sequentially formed by the AC power, the first inductor, the second switch, and the fourth diode; the first inductor is under the energy-releasing operation through a positive half-cycle energy-releasing loop sequentially formed by the AC power, the first inductor, the first diode, the bus capacitor, and the fourth diode.

4. The uninterruptible power supply apparatus with shared electronic components of claim 2, wherein the first inductor is under an energy-storing operation through a negative half-cycle energy-storing loop sequentially formed by the AC power, the third diode, the first switch, and the first inductor; the first inductor is under the energy-releasing operation through a negative half-cycle energy-storing loop sequentially formed by the AC power, the third diode, the bus capacitor, the second diode, and the first inductor.

5. The uninterruptible power supply apparatus with shared electronic components of claim 2, wherein the DC controlling unit comprises:
    a second inductor coupled to the DC power and the switch;
    a power diode coupled to the second inductor; and
    a power switch coupled to the power diode and the DC power.

6. The uninterruptible power supply apparatus with shared electronic components of claim 5, wherein the second inductor is under an energy-storing operation through an energy-storing loop sequentially formed by the DC power, the second inductor, the power diode, and the power switch; the second inductor is under the energy-releasing operation through the energy-releasing loop sequentially formed by the DC power, the second inductor, the first inductor, the first diode, and the bus capacitor.

7. The uninterruptible power supply apparatus with shared electronic components of claim 5, wherein a voltage across the second inductor is coupled to the first indictor, and a voltage across of the first inductor is obtained by multiplying the voltage across the second inductor by a turn ratio of the first inductor to the second inductor.

8. The uninterruptible power supply apparatus with shared electronic components of claim 2, wherein the third bridge arm comprises:
    a fifth switch connected in parallel to a fifth diode and coupled to the first terminal of the bus capacitor;
    a sixth switch connected in parallel to a sixth diode and coupled to the second terminal of the bus capacitor; and
    an outputting circuit coupled to the fifth switch, the sixth switch, and the AC power for providing to the output power.

9. The uninterruptible power supply apparatus with shared electronic components of claim 8, wherein a positive half-cycle first loop of the bus capacitor is sequentially formed by the bus capacitor, the fifth switch, the output circuit, and the fourth switch; a positive half-cycle second loop of the bus capacitor is sequentially formed by the output circuit, the third diode, the bus capacitor, and the sixth diode.

10. The uninterruptible power supply apparatus with shared electronic components of claim 8, wherein a negative half-cycle first loop of the bus capacitor is sequentially formed by the bus capacitor, the third switch, the output circuit, and the sixth switch; a negative half-cycle second loop of the bus capacitor is sequentially formed by the output circuit, the fifth diode, the bus capacitor, and the fourth diode.

11. The uninterruptible power supply apparatus with shared electronic components of claim 1, further comprising a controlling unit configured to provide a plurality of controlling signals for controlling switch, the DC controlling unit, the first bridge arm, the second bridge arm, and the third bridge arm, such that the AC power or the DC power is converted to the bus voltage through the first inductor, the DC controlling unit, the first bridge arm, and the second bridge arm, and then converted to the output power through the second bridge and the third bridge arm.

12. An uninterruptible power supply apparatus with shared electronic components, comprising:
  a direct current (DC) controlling unit coupled to an alternative current (AC) power and a DC power;
  a first inductor coupled to the DC controlling unit;
  a first bridge arm coupled to the first inductor, and the first bridge arm comprising:
    a first switch connected in parallel to a first diode, and coupled to the first inductor; and
    a second switch connected in parallel to a second diode, and coupled to the first inductor;
  a second bridge arm connected in parallel with the first bridge arm;
  a bus capacitor connected in parallel with the second bridge arm, and a first terminal of the bus capacitor coupled to the first switch, a second terminal of the bus capacitor coupled to the second switch; and
  a third bridge arm connected in parallel with the second bridge arm,
  wherein the AC power is converted to a bus voltage through the first inductor, the first bridge arm and the second bridge arm, and the bus voltage is stored on the bus capacitor, and then the bus voltage is converted to an output power through the second bridge arm and the third bridge arm when first inductor is controlled to couple to the AC power by the DC controlling unit; the DC power is converted to the bus voltage through the first inductor and the first bridge arm, and then converted to the output power through the second bridge arm and the third bridge arm when the first inductor is controlled to couple to the DC power by the DC controlling unit;

the DC controlling unit is under an energy-releasing operation through an energy-releasing loop sequentially formed by the DC power, the DC controlling unit, the first inductor, the first diode, the bus capacitor and the DC power.

13. The uninterruptible power supply apparatus with shared electronic components of claim 12, wherein the second bridge arm comprises:
  a third switch connected in parallel to a third diode and coupled to the first terminal of the bus capacitor and the AC power; and
  a fourth switch connected in parallel to a fourth diode and coupled to the AC power and the second terminal of the bus capacitor.

14. The uninterruptible power supply apparatus with shared electronic components of claim 12, wherein the DC controlling unit comprises:
  a first power switch coupled to the AC power and the first inductor; and
  a second power switch coupled to the DC power and the first inductor;
  wherein the AC power is coupled to the first inductor while the first power switch turns on and the second power switch turns off, and the DC power is coupled to the first inductor while the first power switch turns off and the second power switch turns on.

15. The uninterruptible power supply apparatus with shared electronic components of claim 12, wherein the third bridge arm comprises:
  a fifth switch connected in parallel to the fifth diode and coupled to a first terminal of the bus capacitor;
  a sixth switch connected in parallel to the sixth diode and coupled to the fifth switch and a second terminal of the bus capacitor; and
  an outputting circuit coupled to the fifth switch, the sixth switch, and the AC power for providing the output power.

16. The uninterruptible power supply apparatus with shared electronic components of claim 12, further comprising a controlling unit configured to provide a plurality of controlling signals for controlling the DC controlling unit, the first bridge arm, the second bridge arm, and the third bridge arm, such that the AC power or the DC power is converted to the bus voltage through the first inductor, the first bridge arm, and the second bridge arm, and then converted to the output power through the second bridge and the third bridge arm.

* * * * *